US012627492B2

(12) United States Patent
Nakamura

(10) Patent No.: US 12,627,492 B2
(45) Date of Patent: May 12, 2026

(54) USER DEVICE, METHOD, AND COMPUTER PROGRAM

(71) Applicant: NTI, Inc., Yokkaichi (JP)

(72) Inventor: Takatoshi Nakamura, Tokyo (JP)

(73) Assignee: NTI, INC., Mie (JP)

( * ) Notice: Subject to any disclaimer, the term of this patent is extended or adjusted under 35 U.S.C. 154(b) by 270 days.

(21) Appl. No.: 18/259,670

(22) PCT Filed: Jan. 4, 2022

(86) PCT No.: PCT/JP2022/000049
§ 371 (c)(1),
(2) Date: Feb. 2, 2024

(87) PCT Pub. No.: WO2022/145496
PCT Pub. Date: Jul. 7, 2022

(65) Prior Publication Data
US 2024/0214198 A1 Jun. 27, 2024

(30) Foreign Application Priority Data
Jan. 4, 2021 (JP) ................................. 2021-000170

(51) Int. Cl.
*H04L 9/12* (2006.01)
*H04L 9/08* (2006.01)

(52) U.S. Cl.
CPC .............. *H04L 9/12* (2013.01); *H04L 9/0861* (2013.01)

(58) Field of Classification Search
CPC ..... H04L 9/12; H04L 9/0861; H04L 63/0428; H04L 63/06; H04L 9/0891; H04W 12/03; H04W 12/04
See application file for complete search history.

(56) References Cited

U.S. PATENT DOCUMENTS 6,307,940 B1 * 10/2001 Yamamoto ............ H04L 9/0662
380/44
10,439,800 B2 10/2019 Garcia-Morchon et al.
(Continued)

FOREIGN PATENT DOCUMENTS

CN 109981678 B * 4/2021 ......... H04L 63/0815
EP 0939514 A2 * 9/1999 ......... G06Q 20/4012
(Continued)

OTHER PUBLICATIONS

International Search Report, PCT/JP2022/000049, Feb. 21, 2022, 2 pages.

*Primary Examiner* — John B King
(74) *Attorney, Agent, or Firm* — Edell, Shapiro & Finnan, LLC

(57) ABSTRACT

A secure technology for allowing two communication devices intending to execute encrypted communication to have a common initial solution. A large number of user devices all have a function of generating the same solution under the same condition when the user devices have the same initial solution, and can execute encrypted communication through use of a synchronized solution successively generated from the same initial solution. Each of two server devices generates synchronization information which is not the initial solution itself and which is required by the two user devices intending to execute the communication to generate the same initial solution, and transmits the synchronization information to the two user devices each of which executes predetermined calculation on the two pieces of synchronization information, to thereby generate the same initial solution. After that, the two user devices execute the encrypted communication based on the same initial solution.

7 Claims, 6 Drawing Sheets

(56) References Cited

U.S. PATENT DOCUMENTS

| | | | |
|---|---|---|---|
| 11,356,253 B2 * | 6/2022 | Nakamura ............ | H04L 9/0861 |
| 11,394,545 B2 * | 7/2022 | Nakamura ................ | H04L 9/14 |
| 11,451,518 B2 * | 9/2022 | Kobayashi ............ | H04L 9/3247 |
| 11,804,969 B2 * | 10/2023 | Agarwal .................... | H04L 9/30 |
| 2004/0250089 A1 * | 12/2004 | Ochi ........................ | G06F 21/10 |
| | | | 713/161 |
| 2005/0004923 A1 * | 1/2005 | Park ........................ | G06Q 30/02 |
| 2007/0223037 A1 * | 9/2007 | Sasaki .................. | G06F 16/438 |
| | | | 358/1.14 |
| 2008/0299966 A1 * | 12/2008 | Masuda .................. | H04L 63/08 |
| | | | 455/432.1 |
| 2011/0305334 A1 * | 12/2011 | Nakamura ................ | H04L 9/14 |
| | | | 380/255 |
| 2017/0195316 A1 * | 7/2017 | Murdoch ............ | H04L 63/0853 |
| 2017/0257359 A1 * | 9/2017 | Ogawa .................. | G06F 16/951 |
| 2017/0310472 A1 * | 10/2017 | Garcia-Morchon .... | H04L 9/083 |
| 2017/0324564 A1 * | 11/2017 | Knopf ........................ | H04L 9/14 |
| 2019/0273733 A1 * | 9/2019 | Kawabata ........... | H04L 63/0876 |
| 2019/0334707 A1 * | 10/2019 | Nakamura ............ | G06F 21/606 |
| 2019/0394036 A1 * | 12/2019 | Nakamura ................ | H04L 9/14 |
| 2020/0084035 A1 * | 3/2020 | Nakamura ............ | H04L 9/3234 |
| 2020/0366475 A1 * | 11/2020 | Nakamura ............ | H04L 9/0838 |
| 2025/0350461 A1 * | 11/2025 | Ramaraju ............ | H04L 9/3228 |

FOREIGN PATENT DOCUMENTS

| | | | |
|---|---|---|---|
| JP | 2017526304 A | 9/2017 | |
| JP | 2018093417 A | 6/2018 | |

* cited by examiner

USER DEVICE, METHOD, AND COMPUTER PROGRAM

TECHNICAL FIELD

The present invention relates to a communication technology, and more particularly, to an encrypted communication technology.

BACKGROUND ART

For example, when a payment is made on the Internet to a shop existing on the Internet or a balance of an own account is checked or money is transferred to a third party in Internet banking, a user conducting those activities executes communication between an own terminal and a server device of the shop or the like via the Internet. In this communication, it is, as a matter of course, required to prevent tapping of the communication by a malicious third party.

A technology for encrypted communication is widely used to prevent the tapping of the communication not only in a case in which a service relating to money is received on the Internet as described above as a matter of course, but also in a case in which other general communication is executed.

As one of such technologies, the inventor of the present application has already developed a certain technology, and has tried to disseminate the technology. The technology advocated by the inventor of the present application is a technology described below.

To give an overview, in this technology, two communication devices execute communication over a network such as the Internet. In this case, each of the two communication devices includes a solution generator which successively generates a solution which is a string of a predetermined number of characters of at least one type of an alphabetic character, a numeric character, and a symbol. This solution generator generates the solution based on an initial solution, and is configured such that a solution generated under the same condition is always the same. That is, the solution has initial value dependency. As an example, the solution generated by the solution generator is a pseudo-random number.

Moreover, each of the two communication devices includes an encryptor. The encryptor executes processing of encrypting transmission target data being a target of transmission into encrypted data through use of the solution generated by the solution generator. Moreover, each of the two communication devices includes a transmitter which transmits the encrypted data generated by the encryptor to a communication device being an opposite party of the communication.

Moreover, each of the two communication devices includes a receiver which receives the encrypted data from the communication device being the opposite party of the communication. Moreover, each of the two communication devices includes a decryptor which executes processing of decrypting the received encrypted data into the transmission target data through use of the solution generated by the solution generator.

The two communication devices intending to execute the encrypted communication have a common initial solution, and hence can generate the same solution in the solution generators which both thereof include. In the present invention, such a situation is referred to as "situation in which the two devices can generate synchronized solutions." The two communication devices can generate the synchronized solutions, and hence the encrypted communication in those communication devices is extremely secure.

For example, when two devices execute communication of the common key type, those two devices share an algorithm which defines processing for the encryption or the decryption and a common key used when the algorithm is executed. In the above-mentioned communication devices advocated by the inventor of the present application, new synchronized common solutions are successively generated as described above by the solution generators included in the two communication devices which execute the communication. Moreover, the encryptors and the decryptors included in the two communication devices use the common solution as the common key (or common information for generating the common key) which changes at the common timing, to thereby achieve extremely high security for the communication.

The above-mentioned communication device advocated by the inventor of the present application can generate the solution not only each time of the communication, but also at a plurality of timings of the encryption of the transmission target data, and, in the most frequent case, can generate a new solution each time when one unit of data, which is a target of the processing for the encryption or the decryption executed once, is generated by dividing the transmission target data. That is, the above-mentioned communication device advocated by the inventor of the present application updates the common key for the execution of the encrypted communication each time when the communication is executed at least once or, in some cases, at more frequent timings, for example, sequentially generates disposable common keys to execute the encrypted communication, and hence strength of the cryptograph is extremely high.

Note that, it is not always required that the target to be changed by the above-mentioned solution be the common key or other keys, but the target to be changed may be the algorithm. In the above-mentioned communication device, it is important that the solutions generated by the solution generators included in the two communication devices be synchronized with each other, and when this synchronization of the solutions cannot be achieved, the two communication devices cannot execute the encrypted communication. Thus, the two communication devices are required to share, before the execution of the encrypted communication, the same initial solution required for the synchronization of the solutions.

However, the sharing the initial solution is sometimes difficult. That is a case in which the number of the communication devices is large, and two of those large number of communication devices execute the encrypted communication. For example, when a large number of personal computers, cell phones, and smartphones are the above-mentioned communication devices, and two of those communication devices transmit and receive an electric mail, which is an example of the communication, those two communication devices are required to have the common initial solution before start of the communication. In this case, the number of pairs of two communication devices required to execute the encrypted communication is enormous, and hence it takes time and is also difficult to allow the two communication devices in each of all of the pairs to have the common initial solution.

However, the inventor of the present application has already proposed a technology for solving the above-mentioned problem, which is how to allow the two communication devices to have the common initial solution. This technology is to provide, in addition to the large number of communication devices connected to the Internet, a control device which is also connected to the Internet and which manages the encrypted communication n the two communication devices. This control device transmits, to the two communication devices before the start of the encrypted communication, synchronization information being information required by each communication device to generate the common initial solution. The two communication devices intending to execute the communication generate the common initial solution from the synchronization information, to thereby be capable of sharing the common initial solution.

As a result, the two communication devices which have acquired the common initial solution subsequently come to be capable of generating the synchronized key in the solution generators thereof when the encrypted communication is to be executed.

CITATION LIST

Patent Literature

[PTL 1] JP 2018-093417 A

SUMMARY OF INVENTION

Technical Problem

As described above, the sharing of the initial solution and the generation of the synchronized solutions are achieved in the two communication devices by the transmission of the synchronization information from the control device to the two communication devices. Thus, the two communication devices can execute the encrypted communication having extremely high confidentiality.

Such encrypted communication has an extremely low possibility of tapping by a malicious third party. However, the control device knows the synchronization information, and hence, when the control device or an administrator thereof has a malicious intention, the encrypted communication between the two communication devices is possibly tapped by the control device which can generate the initial solution used by the two communication devices based on the synchronization information, the administrator of the control device, or a person conspiring with this administrator.

The present invention has an object to provide a highly secure technology for allowing two communication devices which intend to execute encrypted communication among a large number of communication devices to have a common initial solution required to generate synchronized and successive solutions used for the encrypted communication.

Solution to Problem

The present invention for solving the above-mentioned problem is described below.

According to the present invention, there is provided a method which is executed by specific user devices described later. The specific user devices are two of user devices each forming, in combination with two or more server devices, a communication system including three or more user devices and the two or more server devices that are connected to a network and controls communication among the user devices, the three or more user devices and the two or more server devices being communicable thereamong via the network.

Each of the user devices included in the above-mentioned communication system includes: a user solution generator configured to successively generate, based on an initial solution, a solution that is a string of a predetermined number of characters of at least one type of an alphabetic character, a numeric character, and a symbol, and is always the same when the string is generated under the same condition; a user encryptor configured to execute processing of encrypting transmission target data being a target of transmission into encrypted data through use of the solution generated by the user solution generator; a user transmitter/receiver configured to execute transmission and reception via the network; and a user decryptor configured to execute processing of decrypting the encrypted data received by the user transmitter/receiver into the transmission target data through use of the solution generated by the user solution generator. Further, the specific user devices are adapted to, when the specific user devices have a common initial solution, execute the encrypted communication between the specific user devices is established by each of the user solution generators generating a common solution synchronized between the two user devices, and the own user decryptor decrypting, into the transmission target data, encrypted data that is generated by the user encryptor of an opposite party encrypting the transmission target data, is transmitted from the user transmitter/receiver of the opposite party, and is received by the own user transmitter/receiver.

The method according to the present invention is executed by the specific user devices, and includes: a first step of using, by any one of the specific user devices, the user transmitter/receiver to transmit specification information for specifying both of the specific user devices to a first server device being one of the server devices, and using, by any one of the specific user devices, the user transmitter/receiver to transmit specification information for specifying both of the specific user devices to a second server device being another one of the server devices; a second step of receiving, by the user transmitter/receiver of each of the specific user devices, first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each of the server devices; a third step of receiving, by the user transmitter/receiver of each of the specific user devices, second synchronization information that is generated by the second server device having received the specification information, is transmitted to both of the specific user devices specified by the specification information, and is the synchronization information; and a fourth step of executing, by each of the user devices, predetermined calculation through use of the first synchronization information and the second synchronization information obtain the common initial solution.

The user device and the server device in the present invention roughly correspond to the communication device and the control device, respectively, described in the "Background Art" section.

Each user device includes the user solution generator corresponding to the solution generator included in the communication device described in the "Background Art" section, and the solution can successively be generated by the user solution generator. The specific user devices which are the two user devices intending to execute the encrypted communication among the user devices can use the user solution generators thereof to generate the same solution in the synchronized manner when those two user devices have the common initial solution as in the communication devices described in the "Background Art" section. The specific user devices can use that solution to execute the encrypted communication. The solution is a random number, and, in more detail, is a pseudo-random number which can be generated by a computer.

As described in the "Background Art" section, in order to achieve the state in which the two user devices which are referred to as "specific user devices" in the present invention have the synchronized solutions, it is required for the two user devices to share the common initial solution. This state is achieved by executing the following first step to fourth step in the present invention.

The first step is a step of using, by any one of the specific user devices, the user transmitter/receiver to transmit the specification information for specifying both of the specific user devices to the first server device being one of the server devices, and using, by any one of the specific user devices, the user transmitter/receiver to transmit the specification information for specifying both of the specific user devices to the second server device being another one of the server devices.

In plain words, the first step is a step of notifying, by any one of the specific user devices intending to execute the communication, the two server devices being the first server device and the second server device of the two user devices intending to execute the communication. For example, when an identifier unique to each user device, for example, an ID, an IP address, a telephone number, or the like is assigned to each user device, any of the user devices included in the specific user devices notifies the first server device and the second server device of, as the specification information, the identifiers assigned to the two user devices being the specific user devices. The user device which makes this notification to the first server device and the user device which makes the notification to the second server device may be the same as each other or may be different from each other.

The second step is a step of receiving, by the user transmitter/receiver of each of the specific user devices, the first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each server device.

In plain words, in the second step, the synchronization information is generated in the first server device which has received the specification information, and the first synchronization information being the generated synchronization information is transmitted to the two user devices specified by the specification information. The two user devices being the specific user devices receive the first synchronization information. The pieces of the first synchronization information may be the same as each other or different from each other as described later.

The third step is a step of receiving, by the user transmitter/receiver of each of the specific user devices, the second synchronization information that is generated by the second server device having received the specification information, is transmitted to both of the specific user devices specified by the specification information, and is the synchronization information.

The third step is almost the same as the second step. A difference between the second step and the third step is that the second server device appears in place of the first server device. In plain words, in the third step, the synchronization information is generated in the second server device which has received the specification information, and the second synchronization information being the generated synchronization information is transmitted to the two user devices specified by the specification information. The two user devices being the specific user devices receive the second synchronization information. The pieces of the second synchronization information may be the same as each other or different from each other as described later.

The fourth step is a step of executing, by each of the user devices, the predetermined calculation through use of the first synchronization information and the second synchronization information to obtain the common initial solution. As a result, the two user devices share the common initial solution. For example, when the pieces of the first synchronization information transmitted by the first server device to the respective specific user devices in the second step are the same, and the pieces of the second synchronization information transmitted by the second server device to the respective specific user devices in the third step are the same, the two user devices being the specific user devices can share the same initial solution by each of the two user devices multiplying the first synchronization information and the second synchronization information by each other or obtaining the exclusive OR thereof.

An advantage of allowing the specific user devices to have the same initial solution through the above-mentioned method is as follows.

The initial solution held by the specific user devices as a result of this method cannot be generated without using both of the first synchronization information and the second synchronization information. Moreover, the first server device knows the first synchronization information, but does not know the second synchronization information, and the second server device knows the second synchronization information, but does not know the first synchronization information. Thus, none of the first server device, an administrator thereof, the second server device, and an administrator thereof knows both of the first synchronization information and the second synchronization information, and hence cannot generate the initial solution generated by the two user devices being the specific user devices.

When the administrator of the first server device and the administrator of the second server device conspire with each other, both of the first synchronization information and the second synchronization information can, as a matter of course, be known, and hence the initial solution generated by the specific user devices may also be grasped. However, a possibility of such a case is extremely low compared with a possibility that only one of the first server device or the administrator thereof and the second server device or the administrator thereof is malicious as in the related art described in the "Background Art" section, and such a case is likely to be revealed. Thus, the process of sharing the initial solution between the two user devices as the specific user devices through the method according to the present invention is extremely secure compared with the related art.

The server device in the present invention may include a server-device solution generator similar to the user solution generator included in each user device. That is, the server device may include a server-device solution generator configured to generate, based on the initial solution which is the same as the initial solution in the user device and is different from the initial solutions in other user devices, a solution which is the same as the solution generated by the user solution generator of the each of the user devices and is synchronized with the solution generated by the user solution generator of the each of the user devices. As used herein, the "initial solution" is not the initial solution for generating a solution under a state in which the solution is synchronized between the specific devices, but the initial solution for generating a solution under a state in which the solution is synchronized between the server device and each of the user devices. In this case, each of the server devices may include: a basic information generator configured to successively generate basic information being information unique to the each of the server devices; and a server-device calculator configured to execute reversible calculation through use of the basic information generated by the basic information generator and the solution generated by the server-device solution generator.

When the server device is configured as described above, the second step to the fourth step in the method according to the present invention can be configured as described below.

The second step includes: generating, by the first server device that has received the specification information, through use of the basic information generated by the basic information generator of the first server device and the solution that is generated by the server-device solution generator of the first server device and is generatable by the user solution generator of one of the specific user devices, the first synchronization information through calculation in the server-device calculator of the first server device, and receiving, by the user transmitter/receiver of the one of the specific user device specified by the specification information, the first synchronization information transmitted to the one of the specific user devices; and generating, by the first server device that has received the specification information, through use of the basic information generated by the basic information generator of the first server device and the solution that is generated by the server-device solution generator of the first server device is generatable by the user solution generator of another one of the specific user devices, the first synchronization information through the calculation n the server-device calculator of the first server device, and receiving, by the user transmitter/receiver of the another one of the specific user devices, the first synchronization information different from the first synchronization information transmitted to the one of the specific user devices specified by the specification information.

In plain words, in the second step of this case, the first server device transmits, to the one of the specific user devices, the first synchronization information generated by executing reversible calculation on the basic information generated by the first server device and the solution which can be generated by the one of the specific user device, and transmits, to the another one of the specific user devices, the first synchronization information generated by executing the reversible calculation on the basic information which is the same as the above-mentioned basic information and the solution which can be generated by the another one of the specific user devices. In this case, the pieces of first synchronization information received by the one and the another one of the specific user devices are based on the same basic information, but are obtained through the calculation on the different solutions, and hence are different from each other.

The third step includes: generating, by the second server device that has received the specification information, through use of the basic information generated by the basic information generator of the second server device and the solution that is generated by the server-device solution generator of the second server device and is generatable by the user solution generator of the one of the specific user devices, the second synchronization information through the calculation in the server-device calculator of the second server device, and receiving, by the user transmitter/receiver of the one of the specific user devices specified by the specification information, the second synchronization information transmitted to the one of the specific user devices; and generating, by the second server device that has received the specification information, through use of the basic information generated by the basic information generator of the second server device and the solution that is generated by the server-device solution generator of the second server device and is generatable by the user solution generator of the another one of the specific user devices, the second synchronization information through calculation in the server-device calculator of the second server device, and receiving, by the user transmitter/receiver of the another one of the e specific user devices, the second synchronization information different from the second synchronization information transmitted to the one of the specific user devices specified by the specification information.

The third step is almost the same as the second step. A difference between the second step and the third step is that the second server device appears in place of the first server device. In plain words, in the third step of this case, the second server device transmits, to the one of the specific user devices, the second synchronization information generated by executing the reversible calculation on the basic information generated by the second server device and the solution which can be generated by the one of the specific user device, and transmits, to the another one of the specific user devices, the second synchronization information generated by executing the reversible calculation on the basic information which is the same as the above-mentioned basic information and the solution which can be generated by the another one of the specific user devices. In this case, the pieces of second synchronization information received by the one and the another one of the specific user devices are based on the same basic information, but are obtained through the calculation on the different solutions, and hence are different from each other.

The fourth step includes: executing, by the one of the specific user devices, through use of the solution generated by the user solution generator of the one of the specific user devices and is the same as the solution generated by the first server device when the first synchronization information is generated, reverse calculation of the calculation executed by the server-device calculator of the first server device on the first synchronization information received from the first server device, to thereby extract the basic information generated when the first synchronization information is generated in the first server device, and executing, through use of the solution generated by the user solution generator of the one of the specific user devices and is the same as the solution generated by the second server device when the second synchronization information is generated, reverse calculation of the calculation executed by the server-device calculator of the second server device on the second synchronization information received from the second server device, to thereby extract the basic information generated when the second synchronization information is generated in the second server device; and executing, by the another one of the specific user devices, through use of the solution generated by the user solution generator of the another one of the specific user devices and is the same as the solution generated by the first server device when the first synchronization information is generated, reverse calculation of the calculation executed by the server-device calculator of the first server device on the first synchronization information received from the first server device, to thereby extract the basic information generated when the first synchronization information is generated in the first server device, and executing, through use of the solution generated by the user solution generator of the another one of the specific user devices and is the same as the solution generated the second server device when the second synchronization information is generated, reverse calculation of the calculation executed by the server-device calculator of the second server device on the second synchronization information received from the second server device, to thereby extract the basic information generated when the second synchronization information is generated in the second server device. The fourth step also includes executing, by both of the specific user devices, predetermined calculation on the two pieces of common basic information generated by the first server device and the second server device, to thereby obtain the common initial solution.

In plain words, the one of the specific user devices extracts the basic information generated by the first server device from the first synchronization information received from the first server device, and extracts the basic information generated by the second server device from the second synchronization information received from the second server device. The one of the specific user devices executes the predetermined calculation on those two pieces of the basic information, to thereby generate the initial solution. As described above, the first synchronization information generated by the first server device is obtained by using the solution which can be generated by the one of the specific user devices to execute the reversible calculation on the basic information generated by the first server device, and hence the one of the specific user devices uses the solution which can be generated by the one of the specific user devices and is used by the first server device to execute the reverse calculation to execute, on the first synchronization information, reverse calculation of the calculation executed by the first server device, to thereby be capable of extracting, from the first synchronization information, the basic information generated by the first server device. Similarly, the one of the specific user devices can extract, from the second synchronization information, the basic information generated by the second server device. The one of the specific user devices can obtain the initial solution by executing the predetermined calculation on the two pieces of basic information extracted as described above.

The another one of the specific user devices also executes similar processing. In plain words, the another one of the specific user devices extracts the basic information generated by the first server device from the first synchronization information received from the first server device, and extracts the basic information generated by the second server device from the second synchronization information received from the second server device. The another one of the specific user devices executes the predetermined calculation on those two pieces of the basic information, to thereby generate the initial solution. A reason that the another one of the specific user devices can extract, from the first synchronization information received from the first server device, the basic information generated by the first server device and can extract, from the second synchronization information received from the second server device, the basic information generated by the second server device is the same as the reason that the one of the specific user devices can extract the basic information. After that, the another one of the specific user devices executes the predetermined calculation on those two pieces of basic information, to thereby obtain the initial solution. The basic information generated by the first server device and the basic information generated by the second server device, which are extracted from the first synchronization information and the second synchronization, respectively, by the another one of the specific user devices, are the same as the basic information generated by the first server device and the basic information generated by the second server device, which are extracted by the one of the specific user devices. Thus, the initial solution obtained by the another one of the specific user devices by executing the predetermined calculation on the two pieces of basic information extracted as described above is the same as the initial solution obtained by the one of the specific user devices.

When the server device includes the server-device calculator, the calculation executed by the server-device calculator is required to be reversible as described above. Otherwise, the user device cannot extract the basic information from the first synchronization information or the second synchronization information. An example of the reversible calculation executed by the server-device calculator is to obtain the exclusive OR of the basic information and the solution or to obtain a product of the basic information and the solution.

Moreover, when the server device includes the server-device solution generator, the solution generated by the user solution generator and the solution generated by the server-device solution generator may always have an information amount larger than that of the basic information generated by the basic information generator. This provides the following great effect particularly when the reversible calculation executed by the server-device calculator is obtaining the exclusive OR between the basic information and the solution.

The calculation executed on the basic information and the solution in the server device may be the calculation of the exclusive OR as described above. The calculation of the exclusive OR is used in the Vernam cipher and the one-time pad cipher, each of which is an example of the encrypted communication. Moreover, it is mathematically proved that deciphering of the Vernam cipher and the like is completely impossible when a certain condition is satisfied. This condition is that "executing the calculation of the exclusive OR on a string to be hidden with a random number having an information amount equal to that of the string to be hidden."

The information to be hidden at the time when the first server device transmits the first synchronization information to the two user devices being the specific user devices is the basic information generated by the first server device. Similarly, the information to be hidden at the time when the second server device transmits the second synchronization information to the two user devices being the specific user devices is the basic information generated by the second server device. The first server device can generate the same solution as that of each of both of the specific user devices. The same applies to the second server device. Thus, when the solutions generated by the first server device, the second server device, and the two specific user devices are used as random numbers of the Vernam cipher and the like, the first synchronization information generated by the first server device is brought into an encrypted state the decryption of which is completely impossible. Moreover, the second synchronization information generated by the second server device is brought into an encrypted state the decryption of which is completely impossible. Thus, even when a malicious third party obtains the first synchronization information or the second synchronization information, the correct basic information contained therein cannot be known. In particular, even when the first server device or the administrator thereof acquires the second synchronization information, the first server device or the administrator thereof cannot know the basic information generated by the second server device and contained in the second synchronization information. Moreover, even when the second server device or the administrator thereof acquires the first synchronization information, the second server device or the administrator thereof cannot know the basic information generated by the second server device and contained in the first synchronization information. The first synchronization information and the second synchronization information may, as a matter of course, be transmitted to the specific user device in a further encrypted state. However, even when encrypted communication between the first server device and the specific user device or between the second server device and the specific user device is broken, the basic information or the initial solution generated based on the two pieces of basic information and used between the specific user devices does not leak.

That is, with this method, there exists theoretically no possibility that the initial solution used between the specific user devices leaks for a reason other than such a human reason that the administrator of the first server device and the administrator of the second server device conspire with each other.

The inventor of the present application also proposes, as one aspect of the present invention, a user device which can execute the method according to the present invention. Effects of this user device are equivalent to the effects of the method according to the present invention.

A user device as an example is a user device which forms, in combination with two or more server devices, a communication system including three or more user devices and the two or more server devices that are connected to a network and controls communication among the three or more user devices, the three or more user devices and the two or more server devices being communicable thereamong via the network.

The user device includes: a user solution generator configured to successively generate, based on an initial solution, a solution that is a string of a predetermined number of characters of at least one type of an alphabetic character, a numeric character, and a symbol, and is always the same when the string is generated under the same condition; a user encryptor configured to execute processing of encrypting transmission target data being a target of transmission into encrypted data through use of the solution generated by the user solution generator; a user transmitter/receiver configured to execute transmission and reception via the network; and a user decryptor configured to execute processing of decrypting the encrypted data received by the user transmitter/receiver into the transmission target data through use of the solution generated by the user solution generator.

Further, in the user device, when specific user devices being two user devices intending to execute encrypted communication have a common initial solution, the encrypted communication between the specific user devices is established by each of the user solution generators generating a common solution synchronized between the two user devices, and the own user decryptor decrypting, into the transmission target data, encrypted data that is generated by the user encryptor of an opposite party encrypting the transmission target data, is transmitted from the user transmitter/receiver of the opposite party, and is received by the own user transmitter/receiver.

Further, in the user device, when the user device is one of the specific user devices: any one of the specific user devices uses the user transmitter/receiver to transmit specification information for specifying both of the specific user devices to a first server device being one of the two or more server devices, and any one of the specific user devices uses the user transmitter/receiver to transmit specification information for specifying both of the specific user devices to a second server device being another one of the two or more server devices; the user transmitter/receiver of each of the specific user devices receives first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each of the two or more server devices; the user transmitter/receiver of each of the specific user devices receives second synchronization information that is generated by the second server device having received the specification information, is transmitted to both of the specific user devices specified by the specification and is the synchronization information; and each of the three or more user devices executes predetermined calculation through use of the first synchronization information and the second synchronization information to obtain the common initial solution.

The inventor of the present application also proposes, as one aspect of the present invention, a computer program for enabling a predetermined computer to execute the method according to the present invention. Effects of this computer program are equivalent to the effects of the method according to the present invention, and the enabling the predetermined (for example, a general-purpose) computer to execute the method according to the present invention is one of the effects.

A computer program as an example is a computer program for causing a predetermined computer to function as a user device forming, in combination with two or more server devices, a communication system including three or more user devices and the two or more server devices that are connected to a network and controls communication among the three or more user devices, the three or more user devices and the two or more server devices being communicable thereamong via the network.

The computer program causes the predetermined computer to function as: a user solution generator configured to successively generate, based on an initial solution, a solution that is a string of a predetermined number of characters of at least one type of an alphabetic character, a numeric character, and a symbol, and is always the same when the string is generated under the same condition; a user encryptor configured to execute processing of encrypting transmission target data being a target of transmission into encrypted data through use of the solution generated by the solution user generator; a user transmitter/receiver configured to execute transmission and reception via the network; and a user decryptor configured to execute processing of decrypting the encrypted data received by the user transmitter/receiver into the transmission target data through use of the solution generated by the user solution generator.

Further, the computer program is a computer program for enabling, when specific user devices being two user devices intending to execute encrypted communication have a common initial solution, the specific user devices to establish the encrypted communication, by causing each of the user solution generators to generate a common solution synchronized between the two user devices, and causing the own user decryptor to decrypt, into the transmission target data, encrypted data that is generated by the user encryptor of an opposite party encrypting the transmission target data, is transmitted from the user transmitter/receiver of the opposite party, and is received by the own user transmitter/receiver.

In addition, when the user device is one of the specific user devices, the computer program is a computer program for causing: any one of the specific user devices to use the user transmitter/receiver to transmit specification information for specifying both of the specific user devices to a first server device being one of the two or more server devices, and any one of the specific user devices to use the user transmitter/receiver to transmit specification information for specifying both of the specific user devices to a second server device being another one of the two or more server devices; the user transmitter/receiver of each of the specific user devices to receive first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each of the two or more server devices; the user transmitter/receiver of each of the specific user devices to receive second synchronization information that is generated by the second server device having received the specification information, is transmitted to both of the specific user devices specified by the specification information, and is the synchronization information; and each of the three or more user devices to execute predetermined calculation through use of the first synchronization information and the second synchronization information to obtain the common initial solution.

DESCRIPTION OF EMBODIMENTS

Description is now given of a preferred embodiment and modification examples thereof of the present invention.

In the description of the embodiment and the modification examples, a redundant reference symbol is assigned to a common component, and a common description is omitted depending on the case. Moreover, when inconsistency does not particularly exist in a combination or partial replacement among the embodiment and the modification examples, appropriate combination and appropriate partial replacement between two or more of the embodiment and the modification examples is possible.

Figure 1:
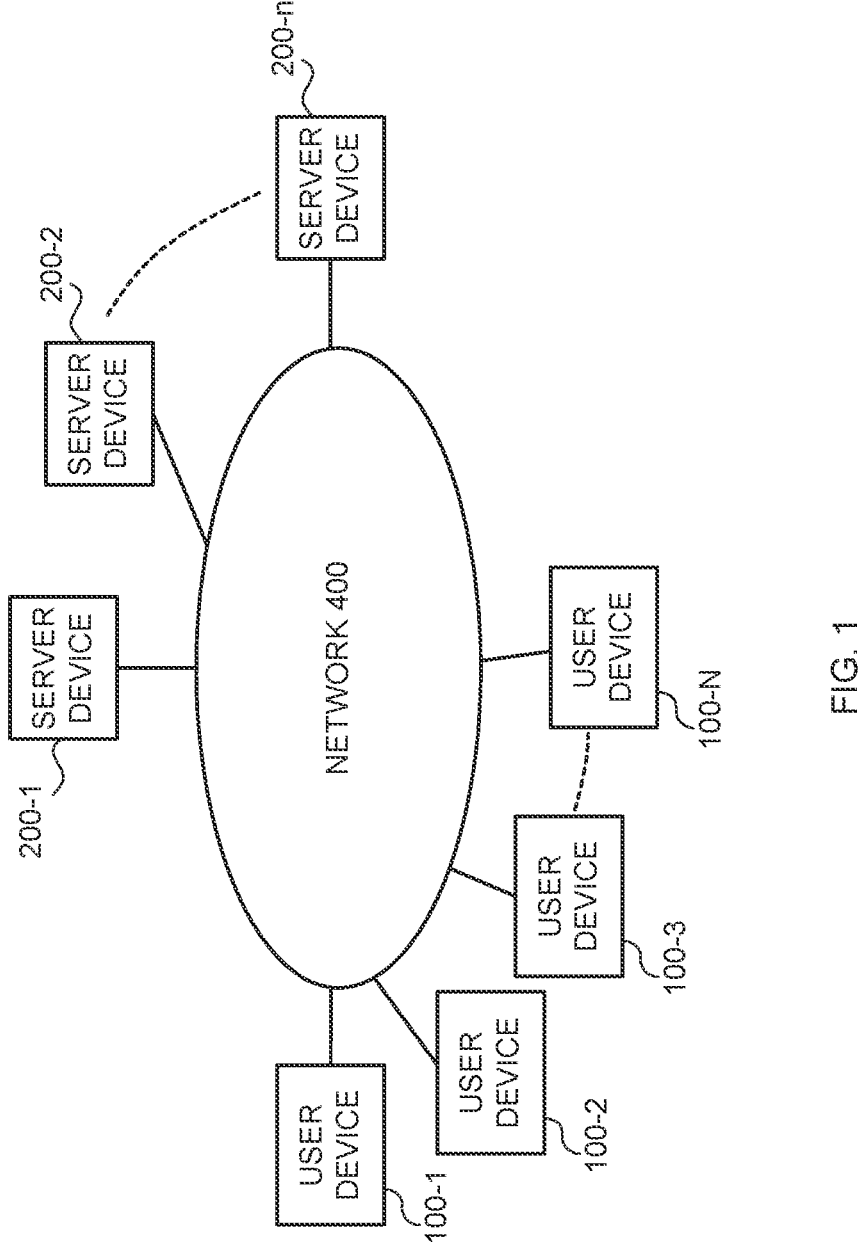
FIG. 1 is a diagram for illustrating an overall configuration of a communication system in an embodiment of the present invention.

FIG. 1 is a diagram for schematically illustrating an overall configuration of a communication system as an embodiment of a transmission and reception system in the present invention.

This communication system in this embodiment includes a large number of user devices 100-1 to 100-N (hereinafter sometimes simply referred to as "user device 100") and a plurality of server devices 200-1 to 200-$n$ (hereinafter sometimes simply referred to as "server device 200"). All of those devices can connect to a network 400. At least three or more user devices 100 exist. At least two or more server devices 200 exist. In general, the number of server devices 200 is overwhelmingly smaller than the number of user devices 100.

The network 400 is the Internet in this embodiment, but is not particularly limited to the Internet.

The user device 100 in this embodiment corresponds to a user device in the present application. Moreover, the server device 200 in this embodiment corresponds to a server device in the present application.

It is assumed that two of the user devices 100-1 to 100-N communicate to and from each other. Each of the user devices 100-1 to 100-N is owned by each user. In this embodiment, it is assumed that the communication is encrypted communication using solutions successively generated, which is described later, but the user devices 100-1 to 100-N may, as a matter of course, communicate to and from each other also in communication other than encrypted communication using a plaintext in addition to the encrypted communication. The communication other than this encrypted communication is only required to be implemented by a publicly-known or well-known technology. The user device 100 may be a computer used to cause another user device 100 to view a website via the network 400.

Each server device 200 may manage all of the user devices 100, but may manage a part of the user devices 100. Examples of the configuration of the management of the user devices 100 by each server device 200 is not particularly limited, but, in this embodiment, it is assumed that each of all of the server devices 200 manages all of the user devices 100. "Management" means capability of generating a solution common to the solution generated by the user device 100 to be managed or capability of transmitting synchronization information (first synchronization information or second synchronization information) to the user device 100. Those points are described later.

It can be assumed that the server device 200 in this embodiment is managed by a company having a public nature to a certain degree, for example, a company which is trusted to such a degree that the company can be a certification authority in the SSL and the TSL or a public organization, but the managing party of the server device 200 is not particularly limited to this example. As another example, the server device 200 may be managed by a provider which provides the connection to the network 400 when the user device 100 connects to the network 400 or a cell phone carrier when the user device 100 is, for example, a smartphone.

The user device 100 includes a computer. More specifically, the user device 100 in this embodiment is built from a general-purpose computer.

A configuration of the user device 100 is now described. Configurations of the user devices 100-1 to 100-N are the same in terms of a relation with the present invention.

The user device 100 is a cell phone, a smartphone, a tablet computer, a laptop personal computer, a desktop personal computer, or the like. All of the user devices 100 are required to be capable of communicating via the network 400, and is also required to be capable of generating function blocks described later by installing a computer program described later inside thereof, and to be capable of then executing processing described later. As a matter of course, as long as those requirements are satisfied, other specifications of the user device 100 are not specifically required.

For example, when the user device 100 is a smartphone or a tablet computer, the user device 100 as the smartphone may be a product of the iPhone series manufactured and sold by Apple Japan, Inc., and the user device 100 as the tablet may be a product of the iPad series manufactured and sold by Apple Japan, Inc. The user device 100 is not particularly limited to the smartphone, but description is given while assuming that the user device 100 is the smartphone.

Figure 2:
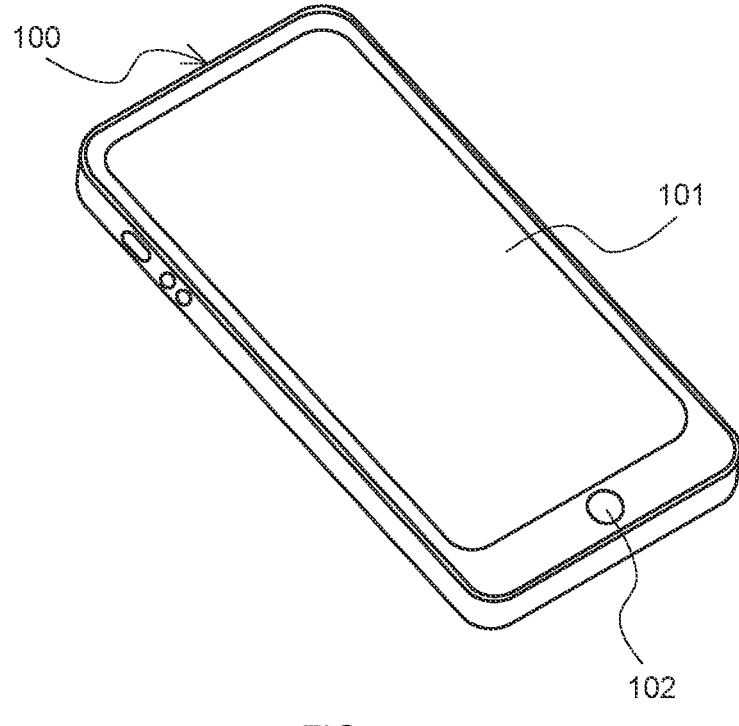
FIG. 2 is a view for illustrating an exterior of a user device included in the communication system of FIG. 1.

An example of an exterior of the user device 100 is illustrated in FIG. 2.

The user device 100 includes a display 101. The display 101 is a component for displaying a still image or a moving image. A publicly-known or well-known display 101 can be used. The display 101 is, for example, a liquid crystal display. The user device 100 also includes an input device 102. The input device 102 is a component for the user to perform a desired input to the user device 100. The input device 102 can be a publicly-known or well-known input device. In this embodiment, the input device 102 of the user device 100 is a button type input device, but the input device 102 is not limited to this, and a numeric keypad, a keyboard, a trackball, or a mouse, for example, can also be used. In particular, when the user device 100 is a laptop personal computer or a desktop personal computer, the input device 102 may be a keyboard or a mouse, for example. Further, when the display 101 is a touch panel, the display 101 also has the function of the input device 102, which is the case in this embodiment.

Figure 3:
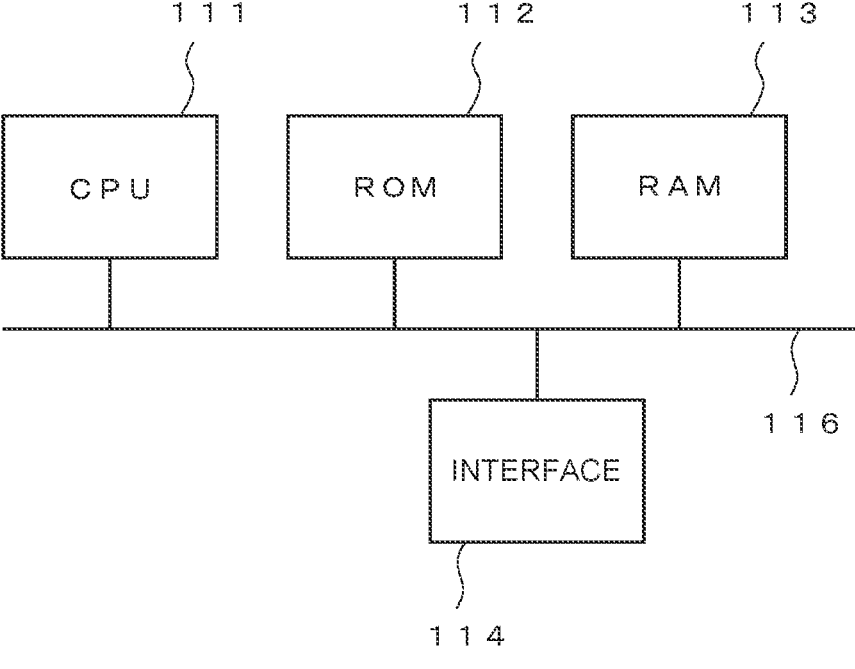
FIG. 3 is a diagram for illustrating a hardware configuration of the user device included in the communication system of FIG. 1.

The hardware configuration of the user device 100 is illustrated in FIG. 3.

The hardware includes a central processing unit (CPU) 111, a read-only memory (ROM) 112, a random-access memory (RAM) 113, and an interface 114, which are connected to one another by a bus 116.

The CPU 111 is an arithmetic device for performing arithmetic operations. The CPU 111 executes processing described later by, for example, executing a computer program recorded in the ROM 112 or the RAM 113. The user device 100 may be equipped with a hard disk drive (HDD) or other large-capacity recording device (not shown), and the computer program may be recorded on the large-capacity recording device.

As used herein, the computer program includes at least a computer program for causing the user device 100 to function as the user device of the present invention. The computer program may be pre-installed in the user device 100 or may be post-installed therein. The computer program may be installed in the user device 100 via a predetermined recording medium, for example, a memory card, or may be installed via a network such as a local area network (LAN) or the Internet.

The ROM 112 has recorded therein computer programs and data required for the CPU 111 to execute the processing described later. The computer programs recorded in the ROM 112 are not limited to this, and when the user device 100 is a smartphone, the ROM 112 has recorded therein computer programs and data required for the user device 100 to function as the smartphone, for example, to execute calling or electronic mail. The user device 100 is also capable of allowing websites to be browsed based on the data received via the network 400, and implements a publicly-known web browser in order to allow such browsing.

The RAM 113 provides a work area required for the CPU 111 to perform processing. In some cases, the above-mentioned computer program and data may be recorded in the RAM 113.

The interface 114 is configured to exchange data between the CPU 111 and RAM 113, for example, which are connected by the bus 116, and the outside. The above-mentioned display 101 and the input device 102 are connected to the interface 114. The operation content input from the input device 102 is input to the bus 116 from the interface 114. Further, as is well known, image data for displaying an image on the display 101 is output from the interface 114 to the display 101.

The interface 114 is also connected to a transmission and reception mechanism (not shown) being publicly-known means for communicating to and from the outside via the network 400 being the Internet, and hence the user device 100 can transmit data via the network 400, and can receive data via the network 400. This transmission and reception of the data via the network 400 may be executed in a wireless manner or a wired manner. For example, when the user device 100 is a s smartphone, this communication may usually be executed in the wireless manner. A configuration of the transmission and reception mechanism may be a publicly-known or well-known configuration as long as such a configuration is possible. Data received by the transmission and reception mechanism from the network 400 is received by the interface 114, and data passed from the interface 114 to the transmission and reception mechanism is transmitted by the transmission and reception mechanism to the outside, for example, another user device 100 or the server device 200 via the network 400. The data received from the network 400 by the transmission and reception mechanism includes at least synchronization information (first synchronization information and second synchronization information) transmitted from the server device 200 and encrypted data transmitted from another user device 100. The data transmitted from the transmission and reception mechanism to the outside includes at least specification information transmitted to the server device 200 and the encrypted data transmitted to another user device 100.

Figure 4:
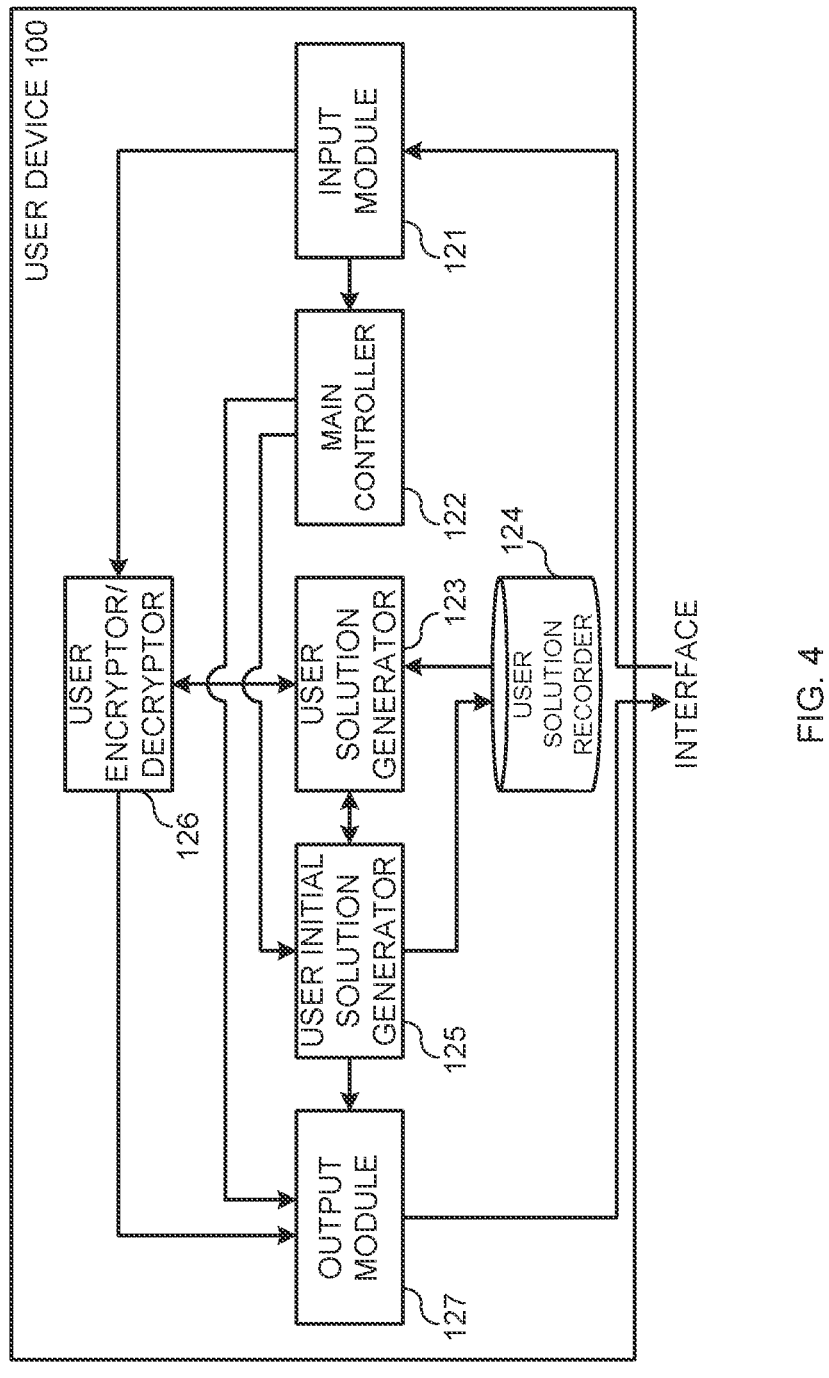
FIG. 4 is a block diagram for illustrating function blocks generated inside the user device included in the communication system of FIG. 1.

Function blocks like those illustrated in FIG. 4 are generated in the user device 100 by the CPU 111 executing a computer program. The function blocks described below may be generated by the function of the above-mentioned computer program which by itself causes the user device 100 to function as the user device of the present invention, or may be generated based on collaboration between the above-mentioned computer program and an OS or another computer program installed in the user device 100.

In the user device 100, in terms of a relation with the functions of the present invention, an input module 121, a main controller 122, a user solution generator 123, a user solution recorder 124, a user initial solution generator 125, a user encryptor/decryptor 126, and an output module 127 are generated. When the user device 100 is a device having a SIM card such as a smartphone, functions of the input module 121, the main controller 122, the user solution generator 123, the user solution recorder 124, the user initial solution generator 125, the user encryptor/decryptor 126, and the output module 127 described below may exist on the SIM card contained in the user device 100. In this case, those functions are not always generated by the computer program installed in the user device 100.

The input module 121 receives inputs from the interface 114.

Inputs from the interface 114 include, for example, the specification information input by the input device 102. The specification information is information for specifying two user devices 100 (specific user devices in the present invention) intending to execute encrypted communication. The specification information on the user device 100 which spontaneously executes the communication is required to be at least information unique among all of the user devices 100, and includes, for example, an IP address of the user device 100, an electronic mail address, a URL, an ID for a social networking service (SNS), and the like. The same applied to the user device 100 on the receiving party of the communication. In this embodiment, examples of the specification information are not particularly limited, but it is assumed that each of both of two user devices being specific user devices 100 is identified by the IP address. In this embodiment, when the user operates the input device 102 to input information for specifying the user device 100 of the opposite party to and from which the encrypted communication is to be executed, the specification information for specifying both of the IP address of this user device 100 and the IP address of the user device 100 of the opposite party is automatically generated, but this embodiment is not limited thereto. In place of this configuration, the specification information may be generated by the user inputting, in the input device 102, both of the IP addresses of the two user devices 100 intending to execute the encrypted communication.

Moreover, the user can generate, by operating the input device 102, data on a server identifier for specifying a server device 200 which is a destination of the transmission of the specification information. A server identifier unique to each server device 200 for identifying the server device 200 is assigned to each server device 200 as to the user device 100, and the user can select the server device 200 being the transmission destination of the specification information by inputting or selecting the server device 200. The server identifier is, for example, an IP address of each server device 200.

Moreover, the user can generate or specify transmission target data by operating the input device 102. This transmission target data is data being a target of transmission and reception at the time when data is transmitted and received in the encrypted state between the user devices 100. For example, when this transmission and reception are transmission and reception of an electronic mail, that data is data on the electronic mail. When one user device 100 provides a website for a virtual shop on the Internet, and another user device 100 is a customer who wants to buy articles in this virtual shop, data transmitted from the user device 100 of the virtual shop is data for providing, to the user device 100 of the customer, a selection screen for the articles and a format for the customer to input customer information, delivery destination information, and the like. Moreover, data transmitted from the user device 100 of the customer to the user device 100 of the virtual shop is information for specifying articles selected as articles to be purchased by the customer and quantities thereof and the customer information and the delivery destination information input by the customer into the above-mentioned format. The transmission target data is text data, image data, sound data, and the like, and the type thereof is not limited. The transmission target data is not required to be data itself input by the user operating the input device 102, but may be a data created by the user device 100 executing predetermined processing on the input data. The second case is rather usual.

Other inputs to the input module 121 from the interface 114 include the above-mentioned synchronization information (first synchronization information and second synchronization information) and encrypted data transmitted from the transmission and reception mechanism to the interface 114.

As described to the input module 121, the specification information and the transmission target data are input as the input from the input device 102, and the synchronization information and the encrypted data are input as the input from the transmission and reception mechanism.

When the input module 121 receives the information and the data, in the case of the reception of the specification information and the synchronization information, transmits the information to the main controller 122, and, in the case of the reception of the transmission target data and the encrypted data, transmits the data to the user encryptor/decryptor 126.

The main controller 122 performs overall control of each of the function blocks generated in the user device 100. The main controller 122 sometimes receives the specification information and the server identifier from the input module 121. When the main controller 122 receives the specification information and the server identifier, the main controller 122 transmits the information and the identifier to the output module 127.

The main controller 122 sometimes receives the synchronization information. When the main controller 122 receives the synchronization information, the main controller 122 transmits the synchronization information to the user initial solution generator 125.

The user solution generator 123 generates a solution. A method of generating the solution is described later. The solution in this embodiment is a string of a predetermined number of characters of at least one type of the alphabetic character, the numeric character, and the symbol, and is always the same when the solution is generated under the same condition based on an initial solution. The solution is typically a pseudo-random number, and each solution is generated such that this solution always has a constant number of digits or a constant number of characters in this embodiment. An information amount of each of a large number of generated solutions is always constant.

A first case in which the user solution generator 123 generates the solution is a case which in the user encryptor/decryptor 126 executes processing for encryption or processing for decryption as described later. The case in which the user encryptor/decryptor 126 executes the processing for the encryption or the processing for the decryption is a case in which the user device 100 executes encrypted communication to and from another user device 100, and details thereof are described later. The user solution generator 123 transmits the solution created for the encrypted communication between the user devices 100 to the user encryptor/decryptor 126.

Moreover, the user solution generator 123 included in the user device 100 may also generate the solution when the synchronization information (first synchronization information and second synchronization information) is transmitted to the user initial solution generator 125. The solution generated at this time is generated in order to generate the initial solution used for the encrypted communication. The solution generated in order to generate the initial solution used for the encrypted communication is transmitted from the user solution generator 123 to the user initial solution generator 125.

The user solution recorder 124 records information required when the user solution generator 123 generates the solution. Data possibly recorded in the user solution recorder 124 is data on a true initial solution and data on the initial solution.

The true initial solution is an initial solution used to generate the solution when the user device 100 and the server device 200 are synchronized with each other. The initial solution is used when the user device 100 executes the encrypted communication to and from another user device 100, that is, to generate the solution under a state in which a certain user device 100 and another user device 100 are synchronized with each other. Both of data on the true initial solution and data on the initial solution affect solutions subsequently generated. The data on the true initial solution and the initial solution have the same format as that of the solution, that is, a string of a predetermined number of characters of at least one type of the alphabetic character, the numeric character, and the symbol, and may have the same number of digits or the same number of characters as that of the solution, or may not have the same number of digits or the same number of characters. In this embodiment, the format is not particularly limited, but the data on the true initial solution and the initial solution have the same format as that of the solution, and the true initial solution and the initial solution have the same number of digits or the same number of characters as that of the solution.

Examples of a state for the generation of the solution is not particularly limited, but each user device 100 in this embodiment can generate the solution in the synchronized state with each of all of the server devices 200. Thus, each of the user devices 100 has, in an initial state, the same true initial solution as the true initial solution held by each server device 200 for being used for this user device 100. That is, in the user solution recorder 124, as many true initial solutions as the number of the server devices 200 are recorded in the initial state. Each true initial solution is recorded in the user solution recorder 124 under a state in which this true initial solution is linked to the server identifier which is unique to each server device 200 for identifying each server device 200 in order to clarify which server device 200 holds this true initial solution.

In the user solution recorder 124, the initial solution may be recorded. The initial solution is generated in both of two user devices 100 being specific user devices as described later. That is, before execution of processing of generating the initial solution, the initial solution does not exist in the first place, and hence the initial solution is not recorded in the user solution recorder 124 before the execution of this processing. When the initial solution is generated, the initial solution is recorded in the user solution recorder 124. This initial solution is recorded at this time in the user solution recorder 124 under a state in which this initial solution is linked to, for example, the IP address of each user device 100, and the IP address is the identifier for identifying each user device 100, and is unique to each user device 100 in order to clarify which user device 100 this initial solution is shared with.

Both of the data on the true initial solution and the data on the initial solution may be updated as described later.

When the user solution generator 123 is to generate the solution, the user solution generator 123 reads out required data from the data recorded in the user solution recorder 124, and uses the read data to generate the solution.

When the user device 100 and the server device 200 are required to be synchronized with each other to generate the solution, the user solution generator 123 reads out the true initial solution or the solution described later to generate the solution. At least when the first solution is to be generated, the user solution generator 123 uses the data on the true initial solution and, as required, other data recorded in the user solution recorder 124.

Meanwhile, when the user devices 100 generate synchronized solutions before the user devices 100 mutually synchronize the solutions to execute the encrypted communication, the user solution generator 123 principally reads out the data on the initial solution recorded in the user solution recorder 124 to generate the synchronized solution.

Details of a method of generating the solution by the user solution generator 123 are described later.

The user initial solution generator 125 serves to use the synchronization information to generate the initial solution required to synchronize the solutions between the two user devices 100 being specific user devices for the encrypted communication. The initial solution to be generated is used to generate the initial solutions synchronized between both of the user devices 100 before the user devices 100 mutually synchronize the solutions to execute the encrypted communication as described above.

As described above, the synchronization information may be transmitted to the user initial solution generator 125 from the main controller 122. When this synchronization information is received, the user initial solution generator 125 generates the initial solution based on this synchronization information. The user initial solution generator 125 may require the solution generated by the user solution generator 123 when the initial solution is to be generated. This solution is a solution synchronized with the solution generated in the server device 200. When the user initial solution generator 125 requires the solution, the user initial solution generator 125 transmits an instruction to generate the solution to the user solution generator 123.

The user solution generator 123 which receives this instruction generates the solution, and transmits the generated solution to the user initial solution generator 125.

The user encryptor/decryptor 126 executes at least one of the processing for the encryption or the processing for the decryption. Examples of the type of the processing to be executed are not particularly limited, but, in this embodiment, the user encryptor/decryptor 126 executes both of the processing for the encryption and the processing for the decryption. The encryption and the decryption are processing required by the user devices 100 to mutually execute the encrypted communication.

The user encryptor/decryptor 126 executes the processing for the encryption and the processing for the decryption only when the main controller 122 allows the execution of the encryption and the decryption.

Details of a method for the encryption are described later, and the user encryptor/decryptor 126 transmits an instruction to generate the solution to the user solution generator 123. The user solution generator 123 generates the solution based on the instruction, and transmits the generated solution to the user encryptor/decryptor 126. This solution is used for the encryption in the user encryptor/decryptor 126. Examples of data to be encrypted are not particularly limited, but the data to be encrypted in this embodiment is the transmission target data generated based on data input from the input device 102. The transmission target data generated in the input device 102 is a plaintext data, and the transmission target data becomes encrypted data as a result of the encryption by the user encryptor/decryptor 126. The encrypted data generated by the user encryptor/decryptor 126 is transmitted to the output module 127.

Details of a method for the decryption are described later, and the user encryptor/decryptor 126 transmits, when the decryption is executed, an instruction to generate the solution to the user solution generator 123. The user solution generator 123 generates the solution based on the instruction, and transmits the generated solution to the user encryptor/decryptor 126. This solution is used for the decryption in the user encryptor/decryptor 126. Examples of the data to be decrypted are not particularly limited, but the data to be decrypted in this embodiment is the encrypted data transmitted from another user device 100. The encrypted data is generated by the user encryptor/decryptor 126 included in the user device 100 which has transmitted the encrypted data, and is restored to original transmission target data as a result of the decryption by the user encryptor/decryptor 126. The plaintext transmission target data generated by the user encryptor/decryptor 126 is transmitted to the output module 127.

The output module 127 outputs the data generated by the function blocks included in the user device 100 to the interface 114.

The specification information and the server identifier may be transmitted to the output module 127 from the main controller 122 as described above. The output module 127 outputs the specification information and the server identifier to the interface 114. This specification information is transmitted from the interface 114 to the transmission and reception mechanism, and is transmitted from the transmission and reception mechanism to the server device 200 specified by the server identifier via the network 400.

The encrypted data may also be transmitted from the user encryptor/decryptor 126 to the output module 127. When the output module 127 receives the encrypted data, the output module 127 outputs this encrypted data to the interface 114. This encrypted data is transmitted from the interface 114 to the transmission and reception mechanism, and is transmitted from the transmission and reception mechanism to another user device 100 being the opposite party of the encrypted communication via the network 400.

The plaintext transmission target data may also be transmitted from the user encryptor/decryptor 126 to the output module 127. This transmission target data is generated by another user device 100. When the output module 127 receives the transmission target data, the output module 127 outputs this transmission target data to the interface 114. The transmission target data is appropriately used in the user device 100, and is transmitted to, for example, the display 101. The display 101 which receives the transmission target data executes display corresponding to the transmission target data.

Next, the configuration of the server device 200 is described.

When viewed as hardware, the server device 200 may be an existing publicly-known or well-known server device. The hardware configuration may be a general configuration (not shown), and roughly speaking, may follow the hardware configuration of the user device 100, in which the CPU 111, the ROM 112, the RAM 113, and the interface 114 are connected by the bus 116. However, the server device 200 generally includes an HDD or other large-capacity recording device, which is the case in this embodiment.

The configuration and function of each of the CPU, the ROM, the RAM, the interface, the bus, and the large-capacity recording device included in the server device 200 are similar to those in the user device 100. The interface included in the server device 200 is connected to a transmission/reception mechanism, which is similar to that included in the user device 100, for performing communication to and from devices outside the server device 200 via the network 400. To the interface included in the server device 200, a display and an input device similar to those included in the user device 100 may be connected, but those components are not particularly relevant to the present application, and thus description thereof is omitted here.

Function blocks like those described below are generated in the server device 200 by executing a computer program, which is recorded in the ROM, the large-capacity recording device, or the like included in the server device 200. The following function blocks may be generated by the functions of the computer program alone for causing the server device 200 to function as the server in the present invention, or may also be generated by that computer program and an OS or another computer program installed in the server device 200 working together in cooperation. The computer program may be preinstalled on the server device 200, or may be installed on the server device 200 after shipment. In that case, the computer program may be installed on the server device 200 via a predetermined recording medium such as a memory card, or may be installed via a network such as a LAN or the Internet. Those matters are the same as in the case of the user device 100.

Figure 5:
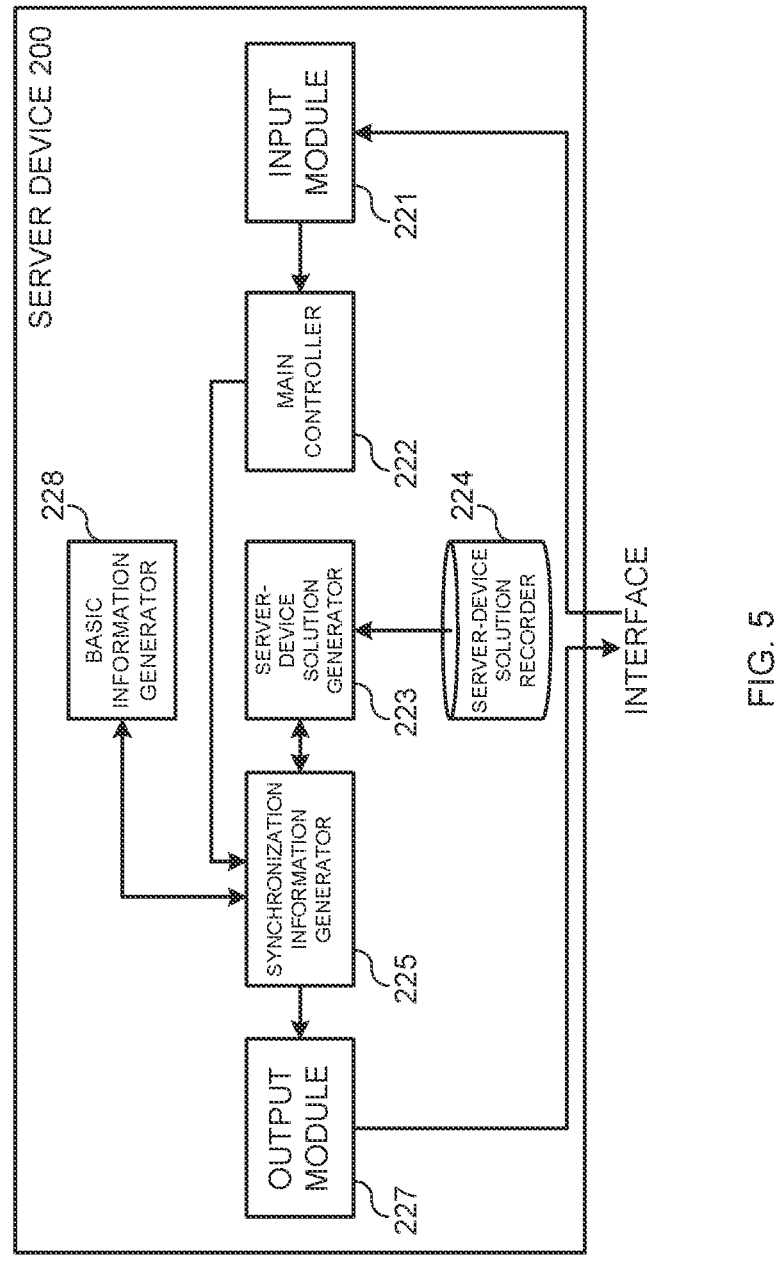
FIG. 5 is a block diagram for illustrating function blocks generated inside a server device included in the communication system of FIG. 1.

In the server device 200, in terms of the relation with the functions of the present invention, an input module 221, a main controller 222, a server-device solution generator 223, a server-device solution recorder 224, a synchronization information generator 225, an output module 227, and a basic information generator 228 are generated (FIG. 5).

The input module 221 receives inputs from the interface.

The input from the interface is, for example, the specification information. The specification information is transmitted from the user device 100 via the network 400, and is received by the transmission and reception mechanism of the server device 200. When the input module 221 receives the specification information, the input module 221 transmits the specification information to the main controller 222.

The main controller 222 performs overall control of the function blocks generated in the server device 200.

The main controller 222 may receive data on the specification information from the input module 221. When the main controller 222 receives the data on the specification information, the main controller 222 transmits this data to the synchronization information generator 225.

The server-device solution generator 223 generates the solution when the server-device solution generator 223 receives an instruction to generate the solution. The server-device solution generator 223 may receive the instruction to generate the solution from the synchronization information generator 225 as described later. When the server-device solution generator 223 receives that instruction, the server-device solution generator 223 generates the solution. The number of solutions generated in this case is two.

A method of generating the solutions is described later, and the generation of the solutions executed by the server-device solution generator 223 is the same as the generation of the solution executed by the user solution generator 123 of each of the user devices 100.

When the server-device solution generator 223 is to generate the solution, the server-device solution generator 223 reads out required data from the data recorded in the server-device solution recorder 224, and uses this data to generate the solution.

In the server-device solution recorder 224, information required by the server-device solution generator 223 to generate the solution is recorded. This information is mainly data on true initial solutions. The data on the true initial solution is the same as the data on the true initial solution recorded in the user solution recorder 124 of each user device 100. The true initial solution is used to generate the solution. The server device 200 in this embodiment is required to generate the solution synchronized with each of all of the user devices 100 (user device 100-1 to the user device 100-N) (but is not limited), and hence, in a state in which no solution is generated, N true initial solutions, which are as many true initial solutions as the number of the user devices 100, are recorded in the server-device solution recorder 224. Moreover, the server-device solution generator 223 is required to grasp which true initial solution corresponds to which user device 100, and hence each true initial solution linked to information for specifying each of the user devices 100 in a one-to-one manner is recorded in the server-device solution recorder 224. The information for specifying each of the user devices 100 is information unique to each of the user devices 100 which is possibly included in the specification information. Examples of that information are not particularly limited, but that information is the IP address of each of the user devices 100 in this embodiment.

When the user devices 100 and the server device 200 are required to be synchronized to generate the solutions, the server-device solution generator 223 included in the server device 200 reads out the true initial solutions linked to the IP addresses of the two user devices 100 specified by the specification information to generate the solutions. At least when the first solutions are to be generated, the server-device solution generator 223 uses the true initial solutions recorded in the server-device solution recorder 224 and uses other data as required.

The server-device solution generator 223 may receive, from the synchronization information generator 225, the instruction to generate the solutions as described above. In this case, the server-device solution generator 223 also receives, from the synchronization information generator 225, the two IP addresses being the information for specifying the two specific user devices included in the specification information. When the server-device solution generator 223 receives the two IP addresses from the synchronization information generator 225, the server-device solution generator 223 reads out, from the server-device solution recorder 224, two true initial solutions or two solutions each of which is linked to one of those two IP addresses. After that, the server-device solution generator 223 uses the read true initial solutions to generate two new solutions. Subsequent solutions are generated based on those true initial solutions. As a result, the server-device solution generator 223 comes to be capable of generating the same solution as the solution generated by each user solution generator 123 included in each of the user devices 100, details of which are described later. That is, the solution generated in the server device 200 and the solution generated in the user device 100 are synchronized with each other.

The two solutions generated by the server-device solution generator 223 are transmitted to the synchronization information generator 225.

The basic information generator 228 generates basic information. The basic information is information used to generate the initial solution in the user device 100 as described later. The basic information generator 228 may receive, from the synchronization information generator 225, an instruction to generate the basic information as described later, and generates the basic information when the basic information generator 228 receives this instruction.

In this embodiment, the basic information is a string of a predetermined number of characters of at least one type of the alphabetic character, the numeric character, and the symbol as the solution. The basic information is set to have the number of digits or the number of characters equal to or smaller than the number of digits or the number of characters of the solution so that the basic information has an information amount smaller than that of the solution. Examples of the number of digits or the number of characters forming the basic information is not particularly limited, but the number of digits or the number of characters of the alphabetic characters, the numeric characters, and the symbols forming the basic information is the same as the number of digits or the number of characters of the alphabetic characters, the numeric characters, and the symbols forming the solution. The basic information generated by the basic information generator 228 is not limited to a pseudo-random number, but the basic information is a pseudo-random number in this embodiment. The basic information generated by each server device 200 is unique to each server device 200.

The basic information generated by the basic information generator 228 is transmitted to the synchronization information generator 225.

The synchronization information generator 225 generates the synchronization information. The synchronization information is information required, when the two user devices 100 included in the specific user devices are to execute the encrypted communication, by both of the two user devices 100 to execute this encrypted communication. The synchronization information is information required to synchronize the solutions between the two user devices 100, and is not the solution itself. Details of the synchronization information are described later.

The reason for the necessity for such synchronization information is that the two user devices 100 included in the specific user devices, which are to execute the encrypted communication, require the common solution (initial solution in the present application) so that the server device 200 and each user device 100 have the common true initial solution when the two devices generate synchronized solutions as already described in this embodiment, but the two user devices 100 cannot synchronize the solutions unless certain information is provided to the two user devices 100 which cannot know the initial solution held by the opposite party.

The synchronization information generator 225 generates the synchronization information when the synchronization information generator 225 receives the specification information from the main controller 222. When the synchronization information generator 225 receives the specification information from the main controller 222, the synchronization information generator 225 issues, to the server-device solution generator 223, an instruction to generate the solution, and receives the two solutions from the server-device solution generator 223. The synchronization information generator 225 also issues, to the basic information generator 228, an instruction to generate the basic information, and receives the basic information from the basic information generator 228.

The synchronization information generator 225 generates the two pieces of synchronization information by executing predetermined calculation on the basic information and one of the two solutions, and executing the predetermined calculation on the basic information and another one of the two solutions. One of the two pieces of synchronization information is for one of the two user devices 100 specified by the specification information, and the another one of the two pieces of synchronization information is for another one of the two user devices 100 specified by the specification information. The predetermined calculation is reversible calculation. Details of a method of generating the synchronization information are described later.

When the synchronization information generator 225 generates the two pieces of synchronization information, the synchronization information generator 225 transmits those two pieces of synchronization information to the output module 227 together with the specification information.

The output module 227 outputs the data generated by the function blocks included in the server device 200 to the interface.

The synchronization information and the specification information are transmitted to the output module 227 from the synchronization information generator 225 as described above. When the output 227 receives module the synchronization information, the output module 227 outputs the synchronization information to the interface together with the specification information. The synchronization information and the specification information are transmitted from the interface to the transmission and reception mechanism, and are transmitted from the transmission and reception mechanism, via the network 400, to both of the two user devices 100 specified by the specification information. It should be understood that the synchronization information for the one of the specific user devices 100 among the two pieces of the synchronization information is transmitted to the one of the specific user devices 100, and the synchronization information for the another one of the specific user devices 100 among the two pieces of the synchronization information is transmitted to the another one of the specific user devices 100. The transmission and reception mechanism of the server device 200 adds the server identifier of the server device 200 to the synchronization information when the transmission and reception mechanism transmits the synchronization information to the user devices 100.

Figure 6:
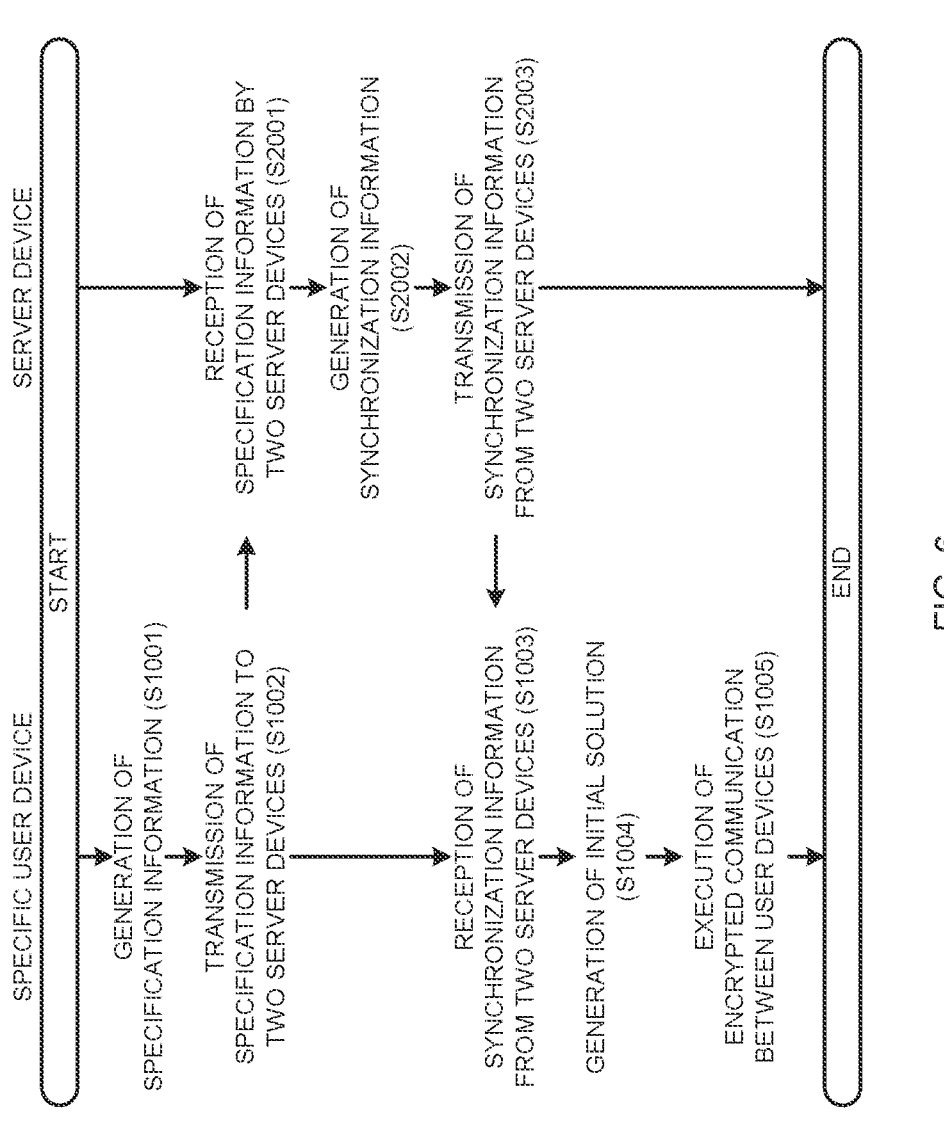
FIG. 6 is a diagram for illustrating a flow of processing executed when communication is executed in the communication system of FIG. 1.

With reference to FIG. 6, a method of using the above-mentioned communication system and a of this communication system are now described.

A user who wants to execute the encrypted communication between an own user device 100 and another user device 100 first operates the input device 102 of the user device 100 owned by the user to input the specification information for specifying the user device 100 of the opposite party of the encrypted communication to be executed. As a result, the specification information being the information for specifying both of the two user devices 100 being the specific user devices intending to execute the encrypted communication are generated (Step S1001). The data on the specification information is transmitted from the input device 102 to the input module 121 via the interface 114, and is transmitted from the input module 121 to the main controller 122.

Similarly, the user operates the input device 102 to input the two server identifiers for specifying the two server devices 200 to which the specification information is to be transmitted. Data on the two server identifiers is transmitted to the main controller 122 as the data on the specification information.

When the main controller 122 receives the data on the specification information and the server identifiers, the main controller 122 transmits the data on the specification information and the server identifiers to the output module 127. The output module 127 transmits the received specification information and server identifiers to the interface 114. The interface 114 further transmits specification information and server identifiers to the transmission and reception mechanism. The specification information is simultaneously transmitted from the transmission and reception mechanism to the two server devices 200 specified by the server identifiers via the network 400 (Step S1002).

The two server devices 200 are basically required to manage both of the two user devices 100 which are specified by the specification information and intend to execute the encrypted communication. That is, the server identifiers to be input by the user are required to be those of the servers which manage both of the two user devices 100 specified by the specification information. However, in this embodiment, examples of the server device 200 are not particularly limited, but each of all of the server devices 200 manages all of the user devices 100, and hence the two server devices 200 to be specified by the user using the server identifiers are only required to be any two server devices 200 among the server devices 200.

In this embodiment, the specification information is transmitted from the one user device 100 which is owned by the user who wants to start the communication among the specific user devices to the two server devices 200, but examples of the transmission of the specification information are not particularly limited. For example, the specification information may be transmitted from the one user device 100 which is owned by the user who wants to start the communication among the specific user devices to a certain server device 200, and the user device 100 of the opposite party may transmit the specification information to another server device 200.

Moreover, in this embodiment, the specification information is transmitted from the one user device 100 which is owned by the user who wants to start the communication among the specific user devices simultaneously to the two server devices 200, but the timing of the transmission of the specification information is not limited to this example. The two pieces of synchronization information are transmitted from the first server device 200 to both of the two user devices 100 being the specific user devices as described later, but, for example, after the first synchronization information arrives at the two user devices 100, the specification information may be transmitted to the second server device 200.

Each of the two server devices 200 uses the transmission and reception mechanism thereof to receive the specification information transmitted from the user device 100 (Step S2001).

In each of both of the server devices 200, the specification information is transmitted to the interface of the server device 200, and is transmitted from the interface to the input module 221. When the input module 221 receives the data on the specification information from the interface, the input module 221 transmits this data to the main controller 222.

When the main controller 222 receives the data on the specification information from the input module 221, the main controller 222 transmits the specification information to the synchronization information generator 225. The synchronization information generator 225 is triggered by the transmission of the data on the specification information to generate the synchronization information being the information required by the two user devices 100 included in the specific user devices specified by the specification information to synchronize the solutions required to execute the encrypted communication in the user devices 100 (Step S2002).

A method of generating the synchronization information as an example is now described.

When the synchronization information generator 225 receives the specification information, the synchronization information generator 225 transmits the instruction to generate the solutions to the server-device solution generator 223 together with the specification information, and transmits the instruction to generate the basic information to the basic information generator 228.

Consequently, the server-device solution generator 223 generates the two solutions, and transmits those solutions to the synchronization information generator 225. The basic information generator 228 generates the basic information, and transmits the basic information to the synchronization information generator 225.

The synchronization information generator 225 uses the solutions and the basic information to generate the synchronization information.

The server-device solution generator 223 in this embodiment reads out the two true initial solutions each linked to one of the two IP addresses included in the specification information. The true initial solution is, as described above, the initial solution as the initial value used to generate the solution synchronized between the server device 200 and each of the user devices 100.

As described above, the server-device solution generator 223 in this embodiment reads out, at least when the server-device solution generator 223 first generates the solution, the true initial solution recorded in the initial state in the server-device solution recorder 224. The data on the true initial solution is a string of a mixture of numeric characters and lower-case alphabetic characters in twenty digits. This applies to the data on the initial solution and the data on the solution. This true initial solution is unique to each of the user devices 100, and is assigned to each of the user devices 100 by the server device 200 or the administrator of the server device 200. The number of the true initial solutions may be one, or may be two or more. In this embodiment, the number of true initial solutions is one, and hence the server-device solution generator 223 reads out the one true initial solution from the server-device solution recorder 224.

The server-device solution generator 223 executes calculation on the true initial solution to generate the solution at this time point.

First, the true initial solution is converted to include only numeric characters for the calculation. When an alphabetic character is included in the true initial solution, this alphabetic character is replaced by a numeric character in two digits. A numeric character obtained by the replacement represents the order of this alphabetic character in the alphabet. For example, "a" is replaced by "01," "b" is replaced by "02," and "z" is replaced by "26." For example, it is assumed that the true initial solution is "5a6458p6556ff4272149." In this case, when the true initial solution is converted to include only numeric characters, "501645816655606064272149" is obtained. The number of digits of the string including only the numeric characters increases in accordance with the number of alphabetic characters included in the true initial solution. When the solution is required to include symbols such as "(",")", "!", "&", and ":", it is only required to assign appropriate numeric characters such as "27" to "(", "28" to")", and "29" to "!".

After that, calculation is executed on the numeric characters. A result obtained by this calculation is a string of numeric characters serving as a source of the solution. When the string of the numeric characters is represented by X, X is obtained as described below in accordance with the year, the month, the day, the hour, and the minute of A.D. at the predetermined time point. $X_1$ in the following equation is a string obtained by converting the true initial solution into the number. The reason for setting the number of true initial solutions to five in this embodiment is that the solution is to be changed in accordance with the five elements being the year, the month, the day, the hour, and the minute of A. D. This method of synchronizing the solutions based on the time is similar to a method for time synchronization, which has existed hitherto.

$$X = X_1^P X_1^Q + X_1^R X_1^S + X_1^T$$

P is obtained by adding 1 to a residual of division of the number representing the year of A.D. by five, Q is obtained by adding 1 to a residual of division of the number representing the month by five, R is obtained by adding 1 to a residual of division of the number representing the day by five, S is obtained by adding 1 to a residual of division of the number representing the hour by five, and T is obtained by adding 1 to a residual of division of the number representing the minute by five. With this configuration, a numerical string which varies in accordance with the time at the moment can be obtained. When all of P to T are 0 by chance, the solution X finally obtained is five, and a reason for the additional step of adding one for all of P to T is to avoid frequent appearance of such a simple number.

As a result of the above-mentioned calculation, the string X of numeric characters serving as the source of the solution is obtained. After that, when one of the numeric characters 01 to 26 is included in any two digits of the string of numeric characters, those numeric characters are replaced by the alphabetic character of a corresponding one of "a" to "z" in accordance with a rule opposite to the rule for replacing the alphabetic character by the numeric character described above.

The string of the mixture of the numeric characters and lower-case alphabetic characters obtained as described above usually has the number of digits equal to or larger than 20. When the string has characters in 20 digits or more, for example, first 20 characters are extracted from the string as the solution. When the string of the mixture of the numeric characters and lower-case alphabetic characters obtained as described above has just 20 digits, the string is simply set as the solution. Moreover, when the string of the mixture of the numeric characters and lower-case alphabetic characters obtained as described above has characters less than 20 digits, the number of digits is increased in accordance with a certain rule. For example, certain numeric characters or alphabetic characters may be inserted into the string based on the first numeric character or alphabetic character of the string until the number of digits reaches 20 digits. As another example, the following method can be adopted, which involves: repeating an operation of generating a new string of the mixture of the numeric characters and lower-case alphabetic characters by executing the above-mentioned process of replacing the numeric characters by the alphabetic characters on a string of the numeric characters obtained by calculation given by an equation in which P and T are switched in the above-mentioned equation, and concatenating the new string to the end of the original string of the mixture of the numeric characters and lower-case alphabetic characters until the number of digits becomes at least 20 digits; and extracting first 20 characters from the at least 20 digits as the solution. In any case, with this method, the solution corresponding to the date and time at a certain time is generated based on the true initial solution. Examples of the certain time are not particularly limited, but, in this embodiment, it is assumed that the server-device solution generator 223 of the server device 200 generates the solution at, for example, a time "five minutes after" a time at which the user device 100 transmits the specification information to the server device 200 (for example, a time specified by a timestamp added by the user device 100 to a packet for the data for transmitting the specification information at the time of the transmission of the specification information). Whether or not such a time is actually reached does not matter, and the same applies hereinafter.

As described above, the server-device solution generator 223 uses the true initial solution for one of the user devices 100 specified by the specification information to generate the solution which can be generated by the one of the user devices 100. Similarly, the server-device solution generator 223 uses the true initial solution for the another one of the user devices 100 specified by the specification information to generate the solution which can be generated by the another one of the user devices 100.

The server-device solution generator 223 transmits the two generated solutions to the synchronization information generator 225. In the transmission, the two solutions are transmitted to the synchronization information generator 225 under a state in which, for example, the solution which can be generated by the one of the user devices 100 is linked to the information which is included in the specification information and specifies the one of the user devices 100, and the solution which can be generated by the another one of the user devices 100 is linked to the information which is included in the specification information and specifies the another one of the user devices 100 so that which solution is for the one the user devices 100 and which solution is for the another one of the user devices 100 are clear.

Meanwhile, the method of generating the basic information by the basic information generator 228 is only required to be an appropriate method for generating a pseudo-random number.

For example, the basic information generator 228 may have an appropriate initial solution for generating the basic information, and may generate the basic information by the same method as that of generating the new solution by the server-device solution generator 223. Examples of the method of generating the basic information are not particularly limited, but, in this embodiment, it is assumed the basic information generator 228 generates the basic information based on an initial solution which is unique to each server device 200 and is used to generate the basic information, as a string of a mixture of numeric characters and lower-case alphabetic characters in twenty digits, by the same method as that of generating the solution by the server-device solution generator 223.

Thus, the basic information generated by each server device 200 is unique, and there is achieved a state in which the basic information generated by each server device 200 cannot be known by another server device 200 or an administrator thereof as long as fraud is not committed.

The basic information generator 228 transmits the generated basic information to the synchronization information generator 225.

The synchronization information generator 225 receives the two solutions and the basic information as described above.

The synchronization information generator 225 generates the synchronization information based thereon. A method of generating the synchronization information is described below.

The synchronization information generator 225 executes predetermined calculation, reversible calculation in this embodiment, on the basic information and the solution for the one of the user devices 100, to thereby generate the synchronization information for the one of the user devices 100. Examples of the reversible calculation is the multiplication and the exclusive OR, and are not limited thereto. In this embodiment, the reversible calculation is executed through the exclusive OR.

Similarly, the synchronization information generator 225 executes predetermined calculation, reversible calculation in this embodiment, on the basic information and the solution for the another one of the user devices 100, to thereby generate the synchronization information for the another one of the user devices 100.

The basic information is the same, but the solution for the one of the user devices 100 and that for the another one of the user devices 100 are different from each other. Thus, the two pieces of synchronization information each generated by executing the calculation on the basic information and the solution are different from each other.

The synchronization information generator 225 transmits the two pieces of generated information to the output module 227. In the transmission, the two pieces of synchronization information are transmitted to the output module 227 under a state in which, for example, the synchronization information for the one of the user devices 100 is linked to the information which is included in the specification information and specifies the one of the user devices 100, and the synchronization information for the another one of the user devices 100 is linked to the information which is included in the specification information and specifies the another one of the user devices 100 so that which piece of synchronization information is for the one of the user devices 100 and which piece of synchronization information is for the another one of the user devices 100 are clear.

The output module 227 transmits those two pieces synchronization information linked to the information which specifies the one and the another one of the user devices 100 to the transmission and reception mechanism via the interface. The transmission and reception mechanism transmits the two pieces of synchronization information to the two user devices 100 specified by the specification information (Step S2003). As a matter of course, the synchronization information for the one of the user devices 100 is transmitted to the one of the user devices 100 included in the specific user devices, and the synchronization information for the another one of the user devices 100 is transmitted to the another one of the user devices 100 included in the specific user devices. The server identifier is added to the synchronization information to be transmitted to the user devices 100 by the transmission and reception mechanism of the server device 200.

The above-mentioned processing steps of from Step S2001 to Step 2003 are similarly executed in the two server devices 200.

Thus, the synchronization information is transmitted from the one server device 200 and the another server device 200 to each of the two user devices 100 being the specific user devices. Of the synchronization information received by each of both of the user devices 100, the synchronization information transmitted from the one server device 200 is the first synchronization information, and the synchronization information transmitted from the another server device 200 is the second synchronization information. Wordings of "first" and "second" in the names of the first synchronization information and the second synchronization information are not relevant to an order of the reception of the synchronization information by the user device 100. Moreover, when the synchronization information is transmitted from the server device 200 to the user device 100, the synchronization information may further be encrypted.

Both of the user devices 100 being the specific user devices receive the synchronization information transmitted from the one server device 200 and the another server device 200 (Step S1003).

Each of the two pieces of synchronization information is received by the transmission and reception mechanism of the user device 100, together with the server identifier assigned to each thereof. The two pieces of synchronization information received by the user devices 100 are transmitted, together with the server identifiers, to the input module 121 via the interface 114, and are transmitted from the input module 121 to the user initial solution generator 125 via the main controller 122.

In the user initial solution generator 125 of the user device 100 which has received the two pieces of synchronization information having the assigned server identifiers, the initial solution is generated based on the two pieces of synchronization information as described below (Step S1004).

When the user initial solution generator 125 receives the synchronization information having the assigned server identifiers as described above, the user initial solution generator 125 transmits, to the user solution generator 123, the server identifiers assigned to the two pieces of synchronization information together with an instruction to generate the solution.

The user solution generator 123 which has received the instruction to generate the solution from the user initial solution generator 125 generates a solution.

The user solution generator 123 generates a new solution as described below.

The user solution generator 123 reads out, from the user solution recorder 124, the true initial solution linked to the one of the two server identifiers. The user solution generator 123 generates the solution by the same method as that used by the server-device solution generator 223 of the server device 200 specified by that server identifier to generate the solution. The true initial solution used by the server-device solution generator 223 to generate the solution and the true initial solution used by the user solution generator 123 to generate the solution are the same, and the method used by the server-device solution generator 223 to generate the solution and the method used by the user solution generator 123 to generate the solution are the same. Thus, the same solution as the solution generated by the server-device solution generator 223 is to be generated by the user solution generator 123. That is, the user solution generator 123 generates the same solution as that generated by the server device 200 specified by the one of the two server identifiers.

Moreover, the user solution generator 123 reads out, from the user solution recorder 124, the true initial solution linked to the another one of the two server identifiers. The user solution generator 123 generates the same solution as that generated by the server device 200 specified by the another one of the two server identifiers through use of that true initial solution.

The two solutions generated as described above are transmitted from the user solution generator 123 to the user initial solution generator 125.

The user initial solution generator 125 has acquired the two pieces of synchronization information in advance as described above. Moreover, the user initial solution generator 125 has acquired the two solutions from the user solution generator 123. The user initial solution generator 125 uses the two pieces of synchronization information and the two solutions to generate the initial solution.

First, the user initial solution generator 125 executes the reverse calculation of the reversible calculation executed by the synchronization information generator 225 of the server device 200 specified by the one of the two server identifiers on the synchronization information transmitted from this server device 200 through use of the solution which can be generated by this server device 200 and is transmitted from the user solution generator 123. As a result, the user initial solution generator 125 can extract, from the synchronization information, the basic information generated by the basic information generator 228 of the server device 200 specified by the one of the two server identifiers.

Similarly, the user initial solution generator 125 executes the reverse calculation of the reversible calculation executed by the synchronization information generator 225 of the server device 200 specified by the another one of the two server identifiers on the synchronization information transmitted from this server device 200 through use of the solution which can be generated by this server device 200 and is transmitted from the user solution generator 123. As a result, the user initial solution generator 125 can extract, from the synchronization information, the basic information generated by the basic information generator 228 of the server device 200 specified by the another one of the two server identifiers.

As a result, the user initial solution generator 125 can acquire the two pieces of basic information generated by the two server devices 200 specified by the two server identifiers, that is, the two server devices 200 which have transmitted the synchronization information.

The user initial solution generator 125 obtains the initial solution by executing predetermined calculation on those two pieces of basic information. The predetermined calculation may be, for example, multiplication of the two pieces of basic information, or may be calculation through the exclusive OR. Examples of the predetermined calculation are not particularly limited, but the latter calculation is employed in this embodiment.

The generated initial solution is transmitted from the user initial solution generator 125 to the user solution recorder 124, and is recorded in the user solution recorder 124. This solution is used for the encrypted communication to and from the user device 100 which is the opposite party of the encrypted communication among the two user devices 100 specified by the specification information, and hence, in order to clarify this, this solution is to be recorded in the user solution recorder 124 under a state in which the solution is linked to information for specifying the user device 100 of the opposite party (in this embodiment, the IP address of the user device 100 of the opposite party).

Similar processing steps, that is, the processing steps of Step S1003 and Step S1004, are also executed in the another one of the two user devices 100 being the specific user devices.

The two pieces of basic information used by the user initial solution generator 125 to generate the initial solution in the another one of the two user devices 100 are the same as the two pieces of basic information used by the one of the two user devices 100 to generate the initial solution, and the pieces of calculation executed on the two pieces of basic information when the initial solutions are generated in both of the user devices 100 are the same predetermined calculation. Thus, the initial solutions generated in the two user devices 100 included in the specific user devices are the same.

The generated initial solution is also recorded in the user solution recorder 124 in the another one of the two user devices 100. At this time, the solution is recorded in the user solution recorder 124 under a state in which the solution is linked to the IP address of the one of the two user devices 100 being the specific user devices.

As a result, the common initial solution is recorded in the user solution recorders 124 of the two user devices 100 being the specific user devices. In other words, the state in which the two user devices 100 being the specific user devices have the common initial solution is formed. That is, as a result, preparation for the encrypted communication by the two user devices 100 being the specific user devices is completed.

In this state, the encrypted communication is executed between the two user devices 100 forming the specific user devices (Step S1005).

In following description of the encrypted the communication, one of the two user devices which are the specific user devices and execute the encrypted communication is referred to as "one user device 100" and another one thereof is referred to as "another user device 100."

First, a case in which encrypted data is transmitted from the one user device 100 to the another user device is described.

Which user device 100 of the two user devices 100 transmits the encrypted data to which user devices 100 can essentially be determined freely. Regardless of whether the encrypted data is transmitted from the one user device 100 to the another user device 100 or the encrypted data is transmitted from the another user device 100 to the one user device 100, only the pieces of processing executed by both of the user devices 100 are opposite to each other, and the pieces of processing themselves executed by both of the user devices 100 do not change.

A user who handles the one user device 100 operates input device 102 of the user device 100 to generate or select the transmission target data. The transmission target data is plaintext data.

The transmission target data is transmitted t from the interface 114 to the input module 121, and is further transmitted to the user encryptor/decryptor 126 in the one user device 100. The transmission target data is to be encrypted in the user encryptor/decryptor 126, and the solution is used therefor. The user encryptor/decryptor 126 transmits the instruction to generate the solution to the user solution generator 123 in order to cause the user solution generator to generate the solution. When the user solution generator 123 receives this instruction, the user solution generator 123 newly generates the solution.

A method of generating the solution by the user solution generator 123 can freely be determined as long as the solutions generated by the user solution generators 123 in the two user devices 100 are synchronized. For example, the method for synchronizing the solutions generated in the user solution generator 123 and the server-device solution generator 223 with each other and the method for synchronizing the solutions generated in the user solution generators 123 in the two user devices 100 being the specific user devices with each other may be the same as each other or may be different from each other.

In this embodiment, it is assumed that the user solution generator 123 included in the one user device 100 generates, independently of the time of day at this time point, the solution corresponding to a time one year, one month, one day, one hour, and one minute after the above-mentioned time used to generate the initial solution. Further, environment information being common information (for example, the temperature of a certain city at the time of the communication or win or loss of a game specified by a certain rule of a certain sport) which is determined in advance between the two user devices 100 and can be acquired by the two user devices 100 located at places remote from each other can be used as information for generating the solution.

The user solution generator 123 uses the initial solution read out from the user solution recorder 124 and uses the above-mentioned method and the above-mentioned time to generate the new solution.

The new solution is transmitted from the user solution generator 123 to the user encryptor/decryptor 126 in the one user device 100.

The user encryptor/decryptor 126 receives the new solution from the user solution generator 123, and uses the new solution to encrypt the transmission target data.

In this case, any method of using the solution can be employed. For example, when the user device 100 and the server device 200 execute the encrypted communication of the common key type, the user encryptor/decryptor 126 can use the new solution as the common key. That is, the solution can be used as the key for the encryption. Moreover, the solution can also be used as information serving as a source for generating the common key. Meanwhile, the solution can also be used to change an algorithm for the encryption. A method of using the solution, such as selecting one algorithm from a plurality of types of algorithms based on the solution, is also possible.

In any case, the transmission target data is encrypted into the encrypted data by the user encryptor/decryptor 126.

The generated encrypted data is transmitted from the user encryptor/decryptor 126 to the output module 127.

The output module 127 of the one user device 100 transmits the encrypted data to the transmission/reception mechanism via the interface 114. The encrypted data is transmitted to the another user device 100 via the network 400.

The another user device 100 receives, in the transmission and reception mechanism thereof, the encrypted data transmitted from the user device 100. The encrypted data is transmitted from the transmission and reception mechanism to the input module 121 via the interface 114. The input module 121 transmits the encrypted data to the user encryptor/decryptor 126.

The user encryptor/decryptor 126 which is included in the another user device 100 and has received the encrypted data decrypts the encrypted data. For that purpose, the user encryptor/decryptor 126 uses the solution generated by the user solution generator 123. The user encryptor/decryptor 126 transmits the instruction to generate the solution to the user solution generator 123 in order to cause the user solution generator 123 to generate the solution. When the user solution generator 123 receives this instruction, the user solution generator 123 newly generates the solution.

The method of generating the solution by the user solution generator 123 included in the another user device 100 is the same as the method employed by the user solution generator 123 of the one user device 100, and the initial solution read out by the user solution generator 123 from the user solution recorder 124 is common to the initial solution used by the one user device 100. As a result, the user solution generator 123 included in the another user device 100 generates the new solution which is the same as the solution generated by the user solution generator 123 of the one user device 100. That is, the two user devices 100 generate the synchronized solutions.

The new solution is transmitted from the user solution generator 123 to the user encryptor/decryptor 126.

The user encryptor/decryptor 126 receives the new solution from the user solution generator 123, and uses the new solution to decrypt the encrypted data.

A method of using the solution in this case follows the method of using the solution in the user encryptor/decryptor 126 of the one user device 100. For example, when the two user devices 100 use the solution as the common key for the encrypted communication of the common key type, and the solution is used in the one user device 100 in such a way, the user encryptor/decryptor 126 included in the another user device 100 also uses the new solution as the common key.

In any case, the encrypted data is decrypted in the user encryptor/decryptor 126, and is restored to the original plaintext transmission target data.

The transmission target data is transmitted from the user encryptor/decryptor 126 to the output module 127. The transmission target data is further transmitted via the interface 114 from the output module 127 to, for example, another application included in the another user device 100 or is transmitted to the display 101 for appropriate display.

When the encrypted data is transmitted from the another user device 100 to the one user device 100, the roles of the one user device 100 and the another user device 100 in the description given above are switched.

When the execution of the encrypted communication becomes no longer required, the encrypted communication is finished.

In the communication system in this embodiment, the number of solutions used in the process of Step S1005 for executing the encrypted communication is only one or the solution used therein is fixed. In place of this configuration, for example, the solution used for the encryption or the decryption can be successively generated by the user solution generators 123 of the two user devices 100 being the specific user devices as the common key for executing the encrypted communication of the common key type is changed one after another. In this case, for example, as there is made such an arrangement that, in order to generate the new solution next to the solution used, the solution corresponding to the time one year, one month, one day, one hour, and one minute after the time at which the solution used was generated is generated among, for example, all of the user solution generators 123 and the server-device solution generator 223, it is only required to make such an arrangement, between, for example, the user solution generators 123 of all of the user devices 100, that solutions to be generated subsequently are solutions corresponding to times one minute after, two minutes after, three minutes after, . . . that time. It is, as a matter of course, possible to make a more complicated arrangement therebetween.

Meanwhile, as the common key for executing the encrypted communication of the common key type is changed one after another, a timing for changing the solution used for executing the encryption and the in decryption the user encryptors/decryptors 126 of the two user devices 100 being the specific user devices can appropriately be determined. For example, the solution used for the encryption or the decryption may be updated to the newly generated solution each time when a predetermined time has elapsed since the start of the encrypted communication, or the solution may be changed or updated each time when an amount of the encrypted data exceeds a certain data amount. For example, when plaintext data is to be encrypted, a method of executing certain calculation on the entire data is not generally used, but a method involving dividing the plaintext data into pieces of smaller data each having a predetermined number of bits and executing the calculation for the encryption on each piece of smaller data is generally used. For example, there may be employed such a method of generating a new solution each time when ten pieces of smaller data are encrypted to change the common key, or, in some cases, such a method of generating a new solution each time when one piece of smaller data is encrypted to change the common key. When such encryption is executed, the party of executing the decryption, as a matter of course, also generates the solution by the same method as that of the party of executing the encryption to change the solution being the common key. Such a method can be executed by both of the two user devices 100 being the specific user devices.

When the two user devices 100 being the specific user devices have once synchronized the solutions with each other as described above, the two user devices 100 being the specific user devices can permanently maintain the state in which the solutions are synchronized with each other while the two user devices 100 are functioning.

For example, when the last solutions generated by both of the user devices 100 are recorded, as initial solutions to be used for the next encrypted communication, in the user solution recorders 124 of both of the user devices 100 at the end of the above-mentioned encrypted communication, the two user devices 100 can use the synchronized solutions to execute the encrypted communication without borrowing the aid from the server devices 200 to cause the server devices 200 to generate the synchronization information for the next encrypted communication. In particular, when the environment information is used to generate the solution as described above, a possibility that the solution and the initial solution are known and acquired by a third party including the server devices 200 and the administrators thereof is substantially eliminated.

Meanwhile, as a matter of course, each of the user devices 100 may not store the initial solution as described above, and may receive the provision of the synchronization information from the server devices 200 each time when encrypted communication is to be executed, to thereby repeat the above-mentioned processing.

Modification Example 1

Modification examples of the above-mentioned communication system are now described.

The communication system described below is different from the communication system in the embodiment described above only in the method for the synchronization of the solutions between the server device 200 and each of the user devices 100 and the method for the synchronization of the solutions between the two user devices 100 being the specific user devices.

In other parts, the communication systems in Modification Example 1 and the embodiment are not different from each other in the configuration, and the methods of using the communication systems and the operations of the communication systems are also not different from each other.

In the embodiment, as the method of generating the solution in the user solution generator 123 included in the user device 100 and the server-device solution generator 223 included in the server device 200, there is employed the method for the synchronization as the time synchronization of related-art methods which generate a one-time password using a token or the like. In contrast, in Modification Example 1, a method of synchronizing, as the event synchronization, the solutions based on the number of solutions generated in the past (or the position of the generated solution in the sequence of the generation) is employed.

In Modification Example 1, the method of generating the new solution in the user solution generator 123 and the server-device solution generator 223 can be, for example, a method of successively generating the solutions by repeating such processing that determined calculation is executed on a certain initial solution to obtain a solution, the determined calculation is executed again on this solution to obtain a next solution, and the determined calculation is executed again on this solution to obtain a next solution, . . . . This technology is well known as a technology for generating a pseudo-random number.

A more specific method of generating the solution by the user solution generator 123 and the server-device solution generator 223 is now described. The method of generating a new solution by the user solution generator 123 of the user device 100 and the method of generating the new solution by the server-device solution generator 223 of the server device 200 are the common to each other, and hence are described without distinguishing those methods from each other. Moreover, the initial solution and the true initial solution are not distinguished from each other, and are described together as the initial solution.

It is only required to execute, each time when the solution is required, a method involving using a certain initial solution (there is a case in which the number of initial solutions is two or more as the following equations (a) and (c)), and assigning a past solution to a predetermined function to successively generate a new solution. With this configuration, the above-mentioned solution can successively be generated. In this case, the solution is a pseudo-random number having initial solution dependency.

As examples of the function used to generate the solution, the following equations (a) to (c) are known. Any one of the equations (a) to (c) is an equation for generating $X_N$ being an N-th solution. Moreover, P, Q, R, and S are appropriate natural numbers.

$$(X_N) = (X_{N-1})^P + (X_{N-2})^Q \quad \text{(a)}$$

$$(X_N) = (X_{N-1})^P \quad \text{(b)}$$

$$(X_N) = (X_{N-1})^P (X_{N-2})^Q (X_{N-3})^R (X_{N-4})^S \quad \text{(c)}$$

The equation (a) uses two past solutions and adding a P-th power and a Q-th power thereof to each other, to thereby generate the new solution. Accurately, when the past two solutions are used, and the P-th power and the Q-th power each thereof are added to each other, the number of digits usually increases, and hence the new solution is actually generated through extraction of an appropriate number of first digits from the obtained value, extraction of an appropriate number of last digits therefrom, extraction of an appropriate number of digits from an appropriate portion thereof, or the like. Examples of the number of digits are not particularly limited, but it is assumed that the solution has 20 digits in this example.

The equation (b) uses the one past solution, and rearranges the number of digits of a P-th power thereof as described above to obtain the new solution.

The equation (c) uses four past solutions to obtain a product of a P-th power, a Q-th power, an R-th power, and an S-th power thereof, and then rearranges the number of digits of the product as described above to obtain the new solution.

The above-mentioned equations (a) to (c) are examples of an algorithm for generating the solution, and the algorithm can be changed when the solution is to be generated, for example, the algorithm can be changed by sequentially using the above-mentioned equations (a) to (c).

The method of using the equations (a) to (c) described above can be used when the solution is formed of only the numeric characters. When it is required to include the alphabetic characters and the symbols in the solution, it is only required to employ the method of assigning the numeric characters to the alphabetic characters and the symbols, which is described in the embodiment.

With the method of using the equation as described above to successively generate the solution, the solution at the same position in the sequence of the generation is always the same as long as the initial solution is the same.

Thus, when the common algorithm is used and the common initial solution is held, the server-device solution generator 223 existing in the server device 200 and the user solution generator 123 existing in the user device 100 can generate common and synchronized solutions. Moreover, the user solution generators 123 existing in the two user devices 100 being the specific user devices can generate common and synchronized solutions.

Examples of the algorithm for generating the solution are not particularly limited, but it is assumed that the user solution generator 123 and the server-device solution generator 223 in Modification Example 1 use the algorithm given by the equation (a) to generate the solution. Moreover, it is assumed that the user solution generators 123 of the two user devices 100 (or all of the user devices 100 in consideration of the fact that all of the user devices 100 can be the specific user devices) included in the specific user devices in Modification Example 1 use the algorithm given by the equation (a) to generate the solutions.

The configuration of the communication system is clarified more by more specifically describing the method of using this communication system and the operation of this communication system.

The operation of the communication system in Modification Example 1 is as illustrated in FIG. 6, and, roughly speaking, is not different from that in the case of the embodiment. In particular, Step S1001 and Step S1002 in the specific user device and Step S2001 in the server device 200 are completely the same as those in the case of the embodiment.

The two server devices 200 receive specification information. The specification information is transmitted to the synchronization information generator 225 via the transmission and reception mechanism, the interface, the input module 221, and the main controller 222. The synchronization information generator 225 included in each of the two server devices 200 generates the synchronization information being the information required by the two user devices 100 included in the specific user devices specified by the specification information to synchronize the solutions required to execute the encrypted communication in the user devices 100 (Step S2002).

Also in the case of Modification Example 1, as in the case of the embodiment, the server-device solution generator 223 generates the two solutions which both of the two user devices 100 specified by the specification information transmitted to the server device 200 can generate.

The server-device solution generator 223 generates the two solutions when the synchronization information generator 225 transmits, together with the specification information, the instruction to generate the solutions to the server-device solution generator 223 as in the case of the embodiment.

The server-device solution generator 223 in Modification Example 1 reads out the true initial solutions or the solutions each linked to each of the two IP addresses included in the specification information. As described above, the server-device solution generator 223 in the embodiment reads out, at least when the server-device solution generator 223 generates the solution for the first time, the data on the true initial solutions recorded in the server-device solution recorder 224. However, in the server-device solution recorder 224 included in the server device 200 in Modification Example 1, in addition to the true initial solutions, information on the number of solutions generated in the past by using those true initial solutions is recorded. The server-device solution generator 223 reads out, from the server-device solution recorder 224, the data on the true initial solutions and the information on the number of solutions generated in the past by using those true initial solutions.

When the server-device solution generator 223 in Modification Example 1 generates the solutions, it is assumed that the server-device solution generator 223 have generated, for example, three solutions in the past. In this case, the server-device solution generator 223 reads out, from the server-device solution recorder 224, the true initial solutions and the numeric character of 3 being the number of solutions generated in the past. The server-device solution generator 223 uses the equation (a) to generate the first solution ($X_1$) from the true initial solution (($X_0$), ($X_{-1}$)), uses the first solution (more accurately, uses ($X_1$) and ($X_0$)) to generate a second solution, and repeats this procedure to generate a fourth solution ($X_4$). After that, the server-device solution generator 223 increases the number of solutions generated in the past, which is recorded in the server-device solution recorder 224, by one to "4". As a result, the solution to be generated next in the server-device solution generator 223 is ($X_5$) being a fifth solution.

The server-device solution generator 223 generates the two solutions for the two user devices 100 specified by the specification information, and transmits the two solutions to the synchronization information generator 225 as in the case of the embodiment.

Meanwhile, as in the case of the embodiment, in response to the request from the synchronization information generator 225, the basic information generator 228 generates the basic information, and transmits the basic information to the synchronization information generator 225.

The synchronization information generator 225 generates two pieces of synchronization information based on the two solutions received from the server-device solution generator 223 and the basic information received from the basic information generator 228. This method is only required to be the same as that in the case of the embodiment, and hence is the same in Modification Example 1.

As in the case of the embodiment, the synchronization information is transmitted to the two user devices 100 being specific user devices (Step S2003).

The synchronization information is transmitted from the two server devices 200 to each of the two user devices 100 being specific user devices.

In each of the two user devices which have received the synchronization information, the synchronization information is transmitted to the user initial solution generator 125 as in the case of the embodiment.

The user initial solution generator 125 included in each of the two user devices 100 transmits the two server identifiers added to the synchronization information to the user solution generator 123 as in the case of the embodiment.

The user solution generator 123 which has received the two server identifiers reads out the true initial solutions (or solutions) which are recorded in the user solution recorder 124 and are linked to the received two server identifiers. The read two true initial solutions (or solutions) are the same as those used in the devices server 200 when the synchronization information transmitted to the user devices 100 is generated. When not the true initial solutions, but the solutions at a certain position in the sequence of the generation are to be read out, the user solution generator 123 reads out the information which is recorded in the user solution recorder 124 as is recorded in the server devices solution recorder 224, and is on the number of solutions generated in the past based on the initial solutions.

The user solution generator 123 uses the read information to generate a new solution. The method of generating the solution is the same as the method of generating the solution in the server-device solution generator 223. The true initial solution or the solution used to generate the new solution is the same as the true initial solution or the solution used by the server-device solution generator 223 when the synchronization information transmitted to the user device 100 is generated by the server device 200, and the method of generating the solution based thereon is the same as the method used to generate the solution by the server-device solution generator 223. Thus, the user solution generator 123 generates the same solution as the solution generated by the server-device solution generator 223 which has transmitted the synchronization information.

The user solution generator 123 generates the same two solutions as the solutions generated by the two server devices 200 which have transmitted the synchronization information.

The user solution generator 123 transmits those two solutions to the user initial solution generator 125.

Subsequent processing is the same as that in the embodiment.

The user initial solution generator 125 executes the predetermined calculation by using the previously received two pieces of synchronization information and the two solutions to generate the pieces of basic information which are generated in the respective two server devices 200 from the two pieces of synchronization information. After that, the user initial solution generator 125 executes the predetermined calculation on the pieces of basic information generated in the respective two server devices 200 to generate the initial solution.

The initial solutions generated by the two user devices 100 being the specific user devices are the same as each other as in the case of the embodiment. As a result, the same initial solution is shared between the two user devices 100 being the specific user devices.

Subsequent processing may completely be the same as that in the case of the embodiment. That is, the processing which is required to implement the encrypted communication (Step S1005) executed in the two user devices being the specific user devices, and generates successively and synchronously the solutions may be achieved through use of the time synchronization used in the token or the like.

Meanwhile, in Modification Example 1, the synchronization of the solutions may be implemented through use of event synchronization implemented by a token or the like, and the following description is given while assuming that the solution is generated in this way in Modification Example 1.

As in the case of the embodiment, in the following description, one of the two user devices which are the specific user devices and execute the encrypted communication is referred to as "one user device 100" and another one thereof is referred to as "another user device 100."

First, a case in which the encrypted data is transmitted from the one user device 100 to the another user device 100 is described.

The user who operates the one user device 100 operates the input device 102 of the user device 100 to generate the transmission target data.

The transmission target data is transmitted from the interface 114 to the user encryptor/decryptor 126 via the input module 121 in the one user device 100. The transmission target data is to be encrypted in the user encryptor/decryptor 126, and the solution is used therefor. The user encryptor/decryptor 126 transmits the instruction to generate the solution to the user solution generator 123 in order to cause the user solution generator 123 to generate the solution. When the user solution generator r 123 receives this instruction, the user solution generator 123 newly generate the solution.

In the user solution recorder 124, $(X_4)$ and $(X_5)$ being the two solutions are recorded as described above. The user solution generator 123 of the one user device 100 reads out those two solutions. When those two solutions are assigned to the equation (a), the user solution generator 123 included in the one user device 100 can generate $(X_6)$ being a sixth solution. The user solution generator 123 records $(X_4)$ and $(X_5)$ in the user solution recorder 124 in order to generate a next solution, and transmits $(X_6)$ being the generated solution to the user encryptor/decryptor 126.

The user encryptor/decryptor 126 uses this solution $(X_6)$ to encrypt the transmission target data. The method of using the solution in the processing for the encryption may be the same as that in the case of the embodiment. The transmission target data is encrypted into the encrypted data by the user encryptor/decryptor 126. The generated encrypted data is transmitted from the user encryptor/decryptor 126 to the output module 127.

The encrypted data is transmitted from the one user device 100 to the another user device 100 as in the case of the embodiment.

The another user device 100 receives, in the transmission and reception mechanism thereof, the encrypted data transmitted from the user device 100. The encrypted data is transmitted from the transmission and reception mechanism to the input module 121 via the interface 114, and is further transmitted to the user encryptor/decryptor 126.

The user encryptor/decryptor 126 which is included in the another user device 100 and has received the encrypted data decrypts the encrypted data. For that purpose, the user encryptor/decryptor 126 uses the solution generated by the user solution generator 123. The user encryptor/decryptor 126 transmits the instruction to generate the solution to the user solution generator 123 in order to cause the user solution generator 123 to generate the solution. When the user solution generator 123 receives this instruction, the user solution generator 123 newly generate the solution.

The method of generating the solution by the user solution generator 123 included in the another user device 100 is the same as the method employed by the user solution generator 123 of the one user device 100, and the initial solution read out by the user solution generator 123 from the user solution recorder 124 is common to the initial solution $((X_4)$ and $(X_5))$ used by the one user device 100. As a result, the user solution generator 123 included in the another user device 100 generates the new solution which is the same as the solution generated by the user solution generator 123 of the one user device 100. That is, the two user devices 100 generate the synchronized solutions.

The new solution is transmitted from the user solution generator 123 to the user encryptor/decryptor 126. The user encryptor/decryptor 126 receives the new solution from the user solution generator 123, and uses the new solution to decrypt the encrypted data. A method for the decryption is the same as that in the case of the embodiment. The encrypted data is decrypted in the user encryptor/decryptor 126, and is restored to the original plaintext transmission target data.

Subsequent processing in the communication system in Modification Example 1 is the same as that in the case of the embodiment.

When the encrypted data is transmitted from the another user device 100 to the one user device 100, the roles of the one user device 100 and the another user device 100 in the description given above are switched.

When the execution of the encrypted communication becomes no longer required, the encrypted communication is finished.

In the communication system in Modification Example 1, the number of solutions used in the process of Step S1005 for executing the encrypted communication is only one or is fixed. In place of this configuration, for example, the solution used for the encryption or the decryption can be successively generated by the user solution generators 123 of the two user devices 100 being the specific user devices as the common key for executing the encrypted communication of the common key type is changed one after another.

As described above, when the same solution immediately before (the number of the solutions is not limited to one) is used, the user solution generators 123 of the two user devices 100 can successively generate the synchronized solutions. The two user devices 100 being the specific user devices can use the synchronized solutions to execute the encrypted communication by successively generating the synchronized common solutions in the user solution generators 123 of the two user devices 100.

A timing which can be employed as the timing for generating the new solution is as described in the embodiment.

Whether or not the solutions synchronized once between the user devices 100 included in the specific user devices are to be used for the subsequent encrypted communication between the two user devices 100 included in those specific user devices can freely be determined as in the case of the embodiment.

In the embodiment, the synchronization information is transmitted to the user device 100 which cannot generate the solution serving as the initial solution. However, it is possible to transmit the synchronization information to both of the user devices 100 and to set, as the initial solution, any one (for example, one determined between both of the user devices 100) of the solutions which are extracted from the synchronization information through use of the own solution in each of both of the user devices 100, and which can be generated only by the user device 100 of the opposite party.

Modification Example 2

A communication system in Modification Example 2 is now described.

The communication system in Modification Example 2 is substantially the same as the communication system described in the embodiment. Both thereof are different from each other in the following points.

The communication system described below is different from the communication system in the embodiment described above only in the method for the synchronization of the solutions between the server device 200 and each of the user devices 100 and the method for the synchronization of the solutions between the two user devices 100 being the specific user devices.

In other parts, the communication systems in Modification Example 2 and the embodiment are not different from each other in the configuration, and the methods of using the communication systems and the operations of the communication systems are also not different from each other.

In the embodiment described above, each server device 200 manages all of the user devices 100, can generate a solution common to that of each of all of the user devices 100, and can transmit the synchronization information (first synchronization information and second synchronization information) to all of the user devices 100. In contrast, at least a part of the server devices 200 in Modification Example 2 can manage only a part of the large number of user devices 100. Such a situation possibly occurs when the user device 100 is, for example, a smartphone, and, for example, each of a company A, a company D, and a company S being cell phone carriers manages only user devices 100 owned by users of the own company.

It is assumed that the user devices 100 included in communication system in Modification Example 2 are 1,000 user device of user device 100-1 to user device 100-1000, and the server devices 200 are six server devices of server device 200-1 to the server device 200-6.

Each of the user devices 100 can have the same configuration as that described in the embodiment. The same applies to the server device 200-1 to the server device 200-4 of the server devices 200. However, server devices 200 which are described below among the server devices 200 can execute the encrypted communication therebetween.

Examples of the form of the management are not particularly limited, but the server device 200-1 manages the user devices 100-1 to the user device 100-300 in the above-mentioned sense in Modification Example 2. That is, the server device 200-1 can generate the solutions synchronized with the solutions generated in all of the user device 100-1 to the user device 100-300. Moreover, the server device 200-1 can provide the synchronization information (first synchronization information or second synchronization information) to any two user devices 100 among the user device 100-1 to the user device 100-300.

Similarly, the server device 200-2 manages the user device 100-301 to the user device 100-600, and the server device 200-3 manages the user device 100-601 to the user device 100-800. Moreover, the server device 200-4 manages the user device 100-1 to the user device 100-1000, that is, all of the user devices 100.

Moreover, the server device 200-1 and the server device 200-2 can establish encrypted communication therebetween. Such encrypted communication may be the encrypted communication which is established between two user devices 100 being the specific user devices in the embodiment and is executed through use of the solutions generated synchronously, or may not be such encrypted communication.

Meanwhile, the server device 200-5 and the server device 200-6 in Modification Example 2 do not manage any user devices 100 in the sense described in the embodiment. However, the server device 200-5 can execute encrypted communication to and from the server device 200-1 and the server device 200-3, and the server device 200-6 can execute encrypted communication to and from the server device 200-2 and the server device 200-4. The encrypted communication executed by the server device 200-5 to and from the server device 200-1 or the server device 200-3 and the encrypted communication executed by the server device 200-6 to and from the server device 200-2 or the server device 200-4 may be the encrypted communication which is established between two user devices 100 being the specific user devices in the embodiment and is executed through use of the solutions generated synchronously, or may not be such encrypted communication.

Figure 7:
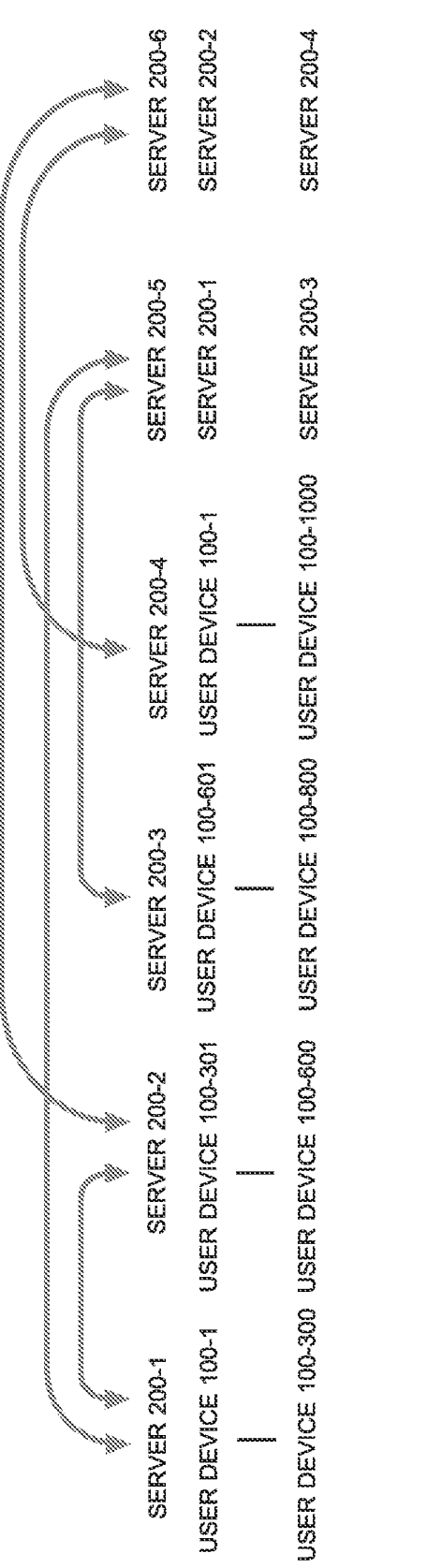
FIG. 7 is a diagram for conceptually illustrating a management relationship between server devices and user devices and availability of encrypted communication between the server devices in a communication system in Modification Example 2.

The description given above is illustrated in FIG. 7. Each of the thick arrows of the figure indicates that the server devices 200 connected via the arrow can execute the encrypted communication. In FIG. 7, the network 400 is not shown.

In the communication system as described above, any two user devices 100 which are managed by a common server device 200 and form the specific user devices can, as a matter of course, acquire, under the server device 200 managing the two user devices 100, the synchronization information (first synchronization information and the second synchronization information) supplied from this server device 200.

That is, the user devices 100-1 to the user device 100-300 can acquire the common synchronization information from the server device 200-1, the user device 100-301 to the user device 100-600 can acquire the common synchronization information from the server device 200-2, the user device 100-601 to the user device 100-800 can acquire the common synchronization information from the server device 200-3, and the user device 100-1 to the user device 100-1000, that is, all of the user devices 100 can acquire the common synchronization information from the server device 200-4.

For example, it is assumed that there occurs such a situation that the user device 100-1 and the user device 100-2 require the common initial solution in order to execute the encrypted communication through use of the solution which can be generated in synchronization with each other. In this case, the user device 100-1 and the user device 100-2 being the specific user devices are required to receive the provision of the first synchronization information and the second synchronization information being the common two pieces of synchronization information from the two server devices 200 as described above in the embodiment.

In this case, each of the user device 100-1 and the user device 100-2 can receive the first synchronization information from one of the server device 200-1 and the server device 200-4 and the second synchronization information from another one of the server device 200-1 and the server device 200-4 by transmitting the specification information to the server device 200-1 and the server device 200-4 which manage the user device 100-1 and the user device 100-2 in common. A method of generating and a method of receiving the first synchronization information and the second synchronization information are as described in the embodiment.

As a result, each of the user device 100-1 and the user device 100-2 executes, for example, the calculation of the exclusive OR on the received first synchronization information and second synchronization information, to thereby be capable of obtaining the common initial solution.

The user device 100-1 and the user device 100-2 can use this initial solution to execute the encrypted communication through use of the solutions which are synchronously generated.

This case is the same as the case of the first embodiment described above. Unless administrators of the server device 200-1 and the server device 200-4 conspire with each other, those administrators cannot know the initial solution used by the user device 100-1 and the user device 100-2.

Meanwhile, for example, it is assumed that there occurs such a situation that the user device 100-1 and the user device 100-400 require the common initial solution in order to execute the encrypted communication through use of the solutions which can be generated in synchronization with each other. In this case, the user device 100-1 and the user device 100-400 being the specific user devices are required to receive the provision of the first synchronization information and the second synchronization information being the common two pieces of synchronization information from the two server devices 200.

As the server device 200 which manages the user device 100-1 and the user device 100-400 in common, the server device 200-4 exists. Thus, the user device 100-1 and the user device 100-400 can acquire one of the first synchronization information and the second synchronization information from the server device 200-4 by any one of the user device 100-1 and the user device 100-400 transmitting the specification information to the server device 200-4. However, there is no other server device 200 which manages both of the user device 100-1 and the user device 100-400, and hence it is a problem from which of the server devices 200 the user device 100-1 and the user device 100-400 receive another one of the first synchronization information and the second synchronization information.

In Modification Example 2, this problem is solved as follows.

For example, the user device 100-1 transmits the specification information to the server device 200-1 which manages the user device 100-1. In this case, the server device

200-1 manages the user device 100-1, but does not manage the another user device 100-400 specified by the specification information, and searches for a server device 200 which manages the user device 100-400 specified by the specification information and can execute the encrypted communication to and from the server device 200-1. For example, the server device 200-1 transmits, to each server device 200, a query asking whether or not this server device 200 manages the user device 100-400. After that, the server device 200-1 finds the server device 200-2 as a server device 200 which manages the user device 100-400.

One of the server device 200-1 and the server device 200-2 generates the another one of the first synchronization information and the second synchronization information. After that, one of the server device 200-1 and the server device 200-2 that has generated the synchronization information transmits the another one of the first information and the second information in an encrypted state to one of the server device 200-1 and the server device 200-2 that has not generated the synchronization information. The server device 200-1 or the server device 200-2 which has received the another one of the first synchronization information and the second synchronization information in the encrypted state restores the another one of the first synchronization second information and the synchronization information to the plaintext. In this state, the another one of the first synchronization information and the second synchronization information has been shared between the server device 200-1 and the server device 200-2.

After that, the server device 200-1 transmits the another one of the encrypted first synchronization information and second synchronization information to the user device 100-1 to and from which the encrypted communication can be executed as a result of the synchronization of the solution, and the server device 200-2 transmits the another one of the encrypted first synchronization information and second synchronization information to the user device 100-400 to and from which the encrypted communication can be executed as a result of the synchronization of the solution. The user device 100-1 and the user device 100-400 decrypt the another one of the encrypted first synchronization information and second synchronization information. As a result, the user device 100-1 and the user device 100-400 are brought into a state in which the user device 100-1 and the user device 100-400 share the another one of the common first synchronization information and second synchronization information.

At this time, the user device 100-1 and the user device 100-400 are in the state in which the user device 100-1 and the user device 100-400 share the common first synchronization information and second synchronization information. As a result, each of the user device 100-1 and the user device 100-400 executes, for example, the calculation of the exclusive OR on the received first synchronization information and second synchronization information, to thereby be capable of obtaining the common initial solution.

The user device 100-1 and the user device 100-400 can use this initial solution to execute the encrypted communication through use of the solutions which are synchronously generated.

In this example, the server device 200-4 can grasp only the one of the first synchronization information and the second synchronization information, and the server device 200-1 and the server device 200-2 can grasp only the another one of the first synchronization information and the second synchronization information. Thus, unless an administrator of the server device 200-1 or the server device 200-2 and the administrator of the server device 200-4 conspire with each other, those administrators cannot know the initial solution used by the user device 100-1 and the user device 100-400.

As described above, the two server devices 200 which manage the two user devices 100 being the specific user devices, respectively, and can mutually execute the encrypted communication cooperate with each other to execute the processing to be executed by one server device 200, to thereby be capable of providing at least one of the first synchronization information or the second synchronization information to the user devices 100 managed by those two server devices 200.

It is, as a matter of course, also possible to cause three or more server devices 200 which can execute the mutual encrypted communication to execute the processing to be executed by one server device 200 as a result of the cooperation thereamong.

For example, it is assumed that there occurs such a situation that the user device 100-1 and the user device 100-800 require the common initial solution in order to execute the encrypted communication through use of the solutions which are synchronously generated. In this case, the user device 100-1 and the user device 100-800 being the specific user devices are required to receive the provision of the first synchronization information and the second synchronization information being the common two pieces of synchronization information from the two server devices 200.

As the server device 200 which manages the user device 100-1 and the user device 100-800 in common, the server device 200-4 exists. Thus, the user device 100-1 and the user device 100-800 can acquire one of the first synchronization information and the second information from the server device 200-4 by any one of the user device 100-1 and the user device 100-800 transmitting the specification information to the server device 200-4. However, there is no other server device 200 which manages both of the user device 100-1 and the user device 100-800, and hence it is a problem from which of the server devices 200 the user device 100-1 and the user device 100-800 receive another one of the first synchronization information and the second synchronization information.

This problem is solved as described below.

For example, the user device 100-1 transmits the specification information to the server device 200-1 which manages the user device 100-1. In this case, the server device 200-1 manages the user device 100-1, but does not manage the another user device 100-800 specified by the specification information, and thus searches for a server device 200 which manages the user device 100-800 specified by the specification information and can execute the encrypted communication to and from the server device 200-1. However, such a server device 200 does not exist. Thus, the server device 200-1 searches for a server device 200 to and from which the server device 200-1 can execute the encrypted communication and which can execute the encrypted communication to and from the server device 200-3 which is a server device 200 managing the user device 100-800. For example, the server device 200-1 transmits, to each server device 200 to and from which the server device 200-1 can execute encrypted communication, a query asking whether or not this server device 200 can execute the encrypted communication to and from the server device 200-3 which is a server device 200 managing the user device 100-800. After that, the server device 200-1 finds the server device 200-5, as the server device 200 which can execute the encrypted communication to and from the server device 200-3 as the server device 200 which manages the user device 100-800.

In plain words, the server device 200-1 can execute the encrypted communication to and from the server device 200-3 via the server device 200-5.

When such a server device 200 is determined, one of the server device 200-1, the server device 200-3, and the server device 200-5 generates the another one of the first synchronization information and the second synchronization information. After that, the server device 200-1, the server device 200-3, and the server device 200-5 share the another one of the first synchronization information and the second synchronization information by ones of the server device 200-1, the server device 200-3, and the server device 200-5 that can execute the encrypted communication to and from each other executing the encrypted communication.

As a result, the another one of the first synchronization information and the second synchronization information is shared between the server device 200-1 and the server device 200-3.

After that, the server device 200-1 transmits the another one of the encrypted first synchronization information and second synchronization information to the user device 100-1 to and from which the encrypted communication can be executed as a result of the synchronization of the solutions, and the server device 200-3 transmits the another one of the encrypted first synchronization information and second synchronization information to the user device 100-800 to and from which the encrypted communication can be executed as a result of the synchronization of the solutions. The user device 100-1 and the user device 100-800 decrypt the another one of the encrypted first synchronization information and second synchronization information. As a result, the user device 100-1 and the user device 100-800 are brought into a state in which the user device 100-1 and the user device 100-800 share the another one of the common first synchronization information and second synchronization information.

At this time, the user device 100-1 and the user device 100-800 are in the state in which the user device 100-1 and the user device 100-800 share the common first synchronization information a synchronization information. As a result, each of the user device 100-1 and the user device 100-800 executes, for example, the calculation of the exclusive OR on the received first synchronization information and second synchronization information, to thereby be capable of obtaining the common initial solution.

The user device 100-1 and the user device 100-800 can use this initial solution to execute the encrypted communication through use of the solutions which are synchronously generated.

In this example, the server device 200-4 can grasp only the one of the first synchronization information and the second synchronization information, and the server device 200-1, the server device 200-3, and the server device 200-5 can grasp only the another one of the first synchronization information and the second synchronization information. Thus, unless the administrator of the server device 200-1, the server device 200-3, or the server device 200-5 and the administrator of the server device 200-4 conspire with each other, none of all of the administrators of the four server devices 200 involved in the supply of the synchronization information can know the initial solution used by the user device 100-1 and the user device 100-800.

As described above, the first synchronization information or the second synchronization (or both thereof) can be distributed to the two user devices 100 being the specific user devices by causing three or more server devices 200 cooperating with one another to execute the processing as one server device 200.

However, it is required that the server devices 200 relating to the supply of the one of the first synchronization information and the second synchronization information and the server devices 200 relating the supply of the another one of the first synchronization information and the second synchronization information not overlap each other. This is because, when such overlap exists, a server device 200 which can grasp both of the first synchronization information and the second synchronization information and consequently can grasp the initial solution used by the specific user devices possibly exists.

The invention claimed is:

1. A method, which is executed by specific user devices being two user devices intending to execute encrypted communication among three or more user devices, each of the three or more user devices forming, in combination with two or more server devices, a communication system including the three or more user devices and the two or more server devices that are connected to a network and controls communication among the three or more user devices, the three or more user devices and the two or more server devices being communicable thereamong via the network, the each of the three or more user devices including:

a user solution generator that generates a pseudo-random number through use of an initial solution by an appropriate method for generating a pseudo-random number by a computer, and is always the same when the string is generated under the same condition;

a user encryptor configured to execute processing of encrypting transmission target data being a target of transmission into encrypted data through use of the solution generated by the user solution generator;

a user transmitter/receiver configured to execute transmission and reception via the network; and a user decryptor configured to execute processing of decrypting the encrypted data received by the user transmitter/receiver into the transmission target data through use of the solution generated by the user solution generator, the specific user devices are adapted to, when the specific user devices have a common initial solution, execute the encrypted communication between the specific user devices is established by each of the user solution generators generating a common solution synchronized between the two user devices, and the own user decryptor decrypting, into the transmission target data, encrypted data that is generated by the user encryptor of an opposite party encrypting the transmission target data, is transmitted from the user transmitter/receiver of the opposite party, and is received by the own user transmitter/receiver, the method comprising:

a first step of using, by any one of the specific user devices, the user transmitter/receiver to transmit specification information for specifying both of the specific user devices to a first server device being one of the two or more server devices, and using, by any one of the specific user devices, the user transmitter/receiver to transmit specification information for specifying both of the specific user devices to a second server device being another one of the two or more server devices;

a second step of receiving, by the user transmitter/receiver of each of the specific user devices, first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each of the two or more server devices;

a third step of receiving, by the user transmitter/receiver of each of the specific user devices, second synchronization information that is generated by the second server device having received the specification information, is transmitted to both of the specific user devices specified by the specification information, and is the synchronization information; and a fourth step of executing, by each of the specific user devices, predetermined calculation through use only of the first synchronization information and the second synchronization information to obtain the common initial solution.

2. The method according to claim 1, wherein each of the two or more server devices includes:

a server-device solution generator configured to generate, based on the initial solution which is the same as the initial solution in the each of the three or more user devices and is different from the initial solutions in other user devices, a solution which is the same as the solution generated by the user solution generator of the each of the three or more user devices and is synchronized with the solution generated by the user solution generator of the each of the three or more user devices, wherein the server-device solution generator generates a pseudo-random number through use of the initial solution by an appropriate method for generating a pseudo-random number by a computer;

a basic information generator configured to successively generate basic information being information unique to the each of the two or more server devices, wherein the basic information generator generates a pseudo-random number by an appropriate method for generating a pseudo-random number by a computer; and a server-device calculator configured to execute reversible calculation through use of the basic information generated by the basic information generator and the solution generated by the server-device solution generator, wherein the second step includes:

generating, by the first server device that has received the specification information, through use of the basic information generated by the basic information generator of the first server device and the solution that is generated by the server-device solution generator of the first server device and is generatable by the user solution generator of one of the specific user devices, the first synchronization information through calculation in the server-device calculator of the first server device, and receiving, by the user transmitter/receiver of the one of the specific user device specified by the specification information, the first synchronization information transmitted to the one of the specific user devices; and generating, by the first server device that has received the specification information, through use of the basic information generated by the basic information generator of the first server device and the solution that is generated by the server-device solution generator of the first server device is generatable by the user solution generator of another one of the specific user devices, the first synchronization information through the calculation in the server-device calculator of the first server device, and receiving, by the user transmitter/receiver of the another one of the specific user devices, the first synchronization information different from the first synchronization information transmitted to the one of the specific user devices specified by the specification information, wherein the third step includes:

generating, by the second server device that has received the specification information, through use of the basic information generated by the basic information generator of the second server device and the solution that is generated by the server-device solution generator of the second server device and is generatable by the user solution generator of the one of the specific user devices, the second synchronization information through the calculation in the server-device calculator of the second server device, and receiving, by the user transmitter/receiver of the one of the specific user devices specified by the specification information, the second synchronization information transmitted to the one of the specific user devices; and generating, by the second server device that has received the specification information, through use of the basic information generated by the basic information generator of the second server device and the solution that is generated by the server-device solution generator of the second server device and is generatable by the user solution generator of the another one of the specific user devices, the second synchronization information through calculation in the server-device calculator of the second server device, and receiving, by the user transmitter/receiver of the another one of the specific user devices, the second synchronization information different from the second synchronization information transmitted to the one of the specific user devices specified by the specification information, and wherein the fourth step includes:

executing, by the one of the specific user devices, through use of the solution generated by the user solution generator of the one of the specific user devices and is the same as the solution generated by the first server device when the first synchronization information is generated, reverse calculation of the calculation executed by the server-device calculator of the first server device on the first synchronization information received from the first server device, to thereby extract the basic information generated when the first synchronization information is generated in the first server device, and executing, through use of the solution generated by the user solution generator of the one of the specific user devices and is the same as the solution generated by the second server device when the second synchronization information is generated, reverse calculation of the calculation

51 executed by the server-device calculator of the second server device on the second synchronization information received from the second server device, to thereby extract the basic information generated when the second synchronization information is generated in the second server device;

executing, by the another one of the specific user devices, through use of the solution generated by the user solution generator of the another one of the specific user devices and is the same as the solution generated by the first server device when the first synchronization information is generated, reverse calculation of the calculation executed by the server-device calculator of the first server device on the first synchronization information received from the first server device, to thereby extract the basic information generated when the first synchronization information is generated in the first server device, and executing, through use of the solution generated by the user solution generator of the another one of the specific user devices and is the same as the solution generated by the second server device when the second synchronization information is generated, reverse calculation of the calculation executed by the server-device calculator of the second server device on the second synchronization information received from the second server device, to thereby extract the basic information generated when the second synchronization information is generated in the second server device; and executing, by both of the specific user devices, predetermined calculation on the two pieces of common basic information generated by the first server device and the second server device, to thereby obtain the common initial solution.

3. The method according to claim 2, wherein the calculation executed by the server-device calculator is to obtain exclusive-OR between the basic information and the solution.

4. The method according to claim 2, wherein the solution generated by the user solution generator and the solution generated by the server-device solution generator always have information amounts equal to or larger than an information amount of the basic information generated by the basic information generator.

5. A user device, which forms, in combination with two or more server devices, a communication system including three or more user devices and the two or more server devices that are connected to a network and controls communication among the three or more user devices, the three or more user devices and the two or more server devices being communicable thereamong via the network, the user device comprising:

a user solution generator that generates a pseudo-random number through use of an initial solution by an appropriate method for generating a pseudo-random number by a computer, and is always the same when the string is generated under the same condition;

a user encryptor configured to execute processing of encrypting transmission target data being a target of transmission into encrypted data through use of the solution generated by the user solution generator;

a user transmitter/receiver configured to execute transmission and reception via the network; and a user decryptor configured to execute processing of decrypting the encrypted data received by the user transmitter/receiver into the transmission target data through use of the solution generated by the user solution generator, wherein, when specific user devices being two user devices intending to execute encrypted communication have a common initial solution, the encrypted communication between the specific user devices is established by each of the user solution generators generating a common solution synchronized between the two user devices, and the own user decryptor decrypting, into the transmission target data, encrypted data that is generated by the user encryptor of an opposite party encrypting the transmission target data, is transmitted from the user transmitter/receiver of the opposite party, and is received by the own user transmitter/receiver, and wherein, when the user device is one of the specific user devices:

any one of the specific user devices uses the user transmitter/receiver to transmit specification information for specifying both of the specific user devices to a first server device being one of the two or more server devices, and any one of the specific user devices uses the user transmitter/receiver to transmit specification information for specifying both of the specific user devices to a second server device being another one of the two or more server devices;

the user transmitter/receiver of each of the specific user devices receives first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each of the two or more server devices;

the user transmitter/receiver of each of the specific user devices receives second synchronization information that is generated by the second server device having received the specification information, is transmitted to both of the specific user devices specified by the specification information, and is the synchronization information; and each of the three or more user devices executes predetermined calculation through use only of the first synchronization information and the second synchronization information to obtain the common initial solution.

6. One or more non-transitory computer readable storage media encoded with instructions that, when executed by a processor, cause the processor to:

function as a user device forming, in combination with two or more server devices, a communication system including three or more user devices and the two or more server devices that are connected to a network and controls communication among the three or more user devices, the three or more user devices and the two or more server devices being communicable thereamong via the network, the instructions causing the processor to further function as:

a user solution generator that generates a pseudo-random number through use of an initial solution by an appropriate method for generating a pseudo-random number by a computer, and is always the same when the string is generated under the same condition;

a user encryptor configured to execute processing of encrypting transmission target data being a target of transmission into encrypted data through use of the solution generated by the user solution generator;

a user transmitter/receiver configured to execute transmission and reception via the network; and a user decryptor configured to execute processing of decrypting the encrypted data received by the user transmitter/receiver into the transmission target data through use of the solution generated by the user solution generator, wherein, when specific user devices being two user devices intending to execute encrypted communication have a common initial solution, the processor establishes the encrypted communication between the specific user devices, by causing each of the user solution generators to generate a common solution synchronized between the two user devices, and causing the own user decryptor to decrypt, into the transmission target data, encrypted data that is generated by the user encryptor of an opposite party encrypting the transmission target data, is transmitted from the user transmitter/receiver of the opposite party, and is received by the own user transmitter/receiver, and wherein, when the user device is one of the specific user devices, the processor causes:

any one of the specific user devices to use the user transmitter/receiver to transmit specification information for specifying both of the specific user devices to a first server device being one of the two or more server devices, and any one of the specific user devices to use the user transmitter/receiver to transmit specification information for specifying both of the specific user devices to a second server device being another one of the two or more server devices;

the user transmitter/receiver of each of the specific user devices to receive first synchronization information that is generated by the first server device having received the specification information, is transmitted to both of the specific user devices specified by the specification information, is information required by the specific user devices to acquire the same initial solution to synchronize the solutions between the specific user devices, and is synchronization information unique to each of the two or more server devices;

the user transmitter/receiver of each of the specific user devices to receive second synchronization information that is generated by the second server device having received the specification information, is transmitted to both of the specific user devices specified by the specification information, and is the synchronization information; and each of the three or more user devices to execute predetermined calculation through use only of the first synchronization information and the second synchronization information to obtain the common initial solution.

7. The method according to claim 3, wherein the solution generated by the user solution generator and the solution generated by the server-device solution generator always have information amounts equal to or larger than an information amount of the basic information generated by the basic information generator.

* * * * *